(12) United States Patent
Imanishi et al.

(10) Patent No.: US 11,165,501 B2
(45) Date of Patent: Nov. 2, 2021

(54) EXCITATION LIGHT SOURCE APPARATUS AND OPTICAL TRANSMISSION SYSTEM

(71) Applicant: Mitsubishi Electric Corporation, Chiyoda-ku (JP)

(72) Inventors: Katsunori Imanishi, Tokyo (JP); Toshiyuki Tokura, Tokyo (JP); Shun Chikamori, Tokyo (JP); Kengo Takata, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 574 days.

(21) Appl. No.: 16/074,200

(22) PCT Filed: Feb. 19, 2016

(86) PCT No.: PCT/JP2016/054846
§ 371 (c)(1),
(2) Date: Jul. 31, 2018

(87) PCT Pub. No.: WO2017/141423
PCT Pub. Date: Aug. 24, 2017

(65) Prior Publication Data
US 2020/0044741 A1    Feb. 6, 2020

(51) Int. Cl.
*H04B 10/291* (2013.01)
*H04B 10/293* (2013.01)
(Continued)

(52) U.S. Cl.
CPC ....... *H04B 10/2916* (2013.01); *H04B 10/293* (2013.01); *G02F 1/35* (2013.01); *H01S 3/302* (2013.01)

(58) Field of Classification Search
CPC ............................. H01S 3/302; H04B 10/2916
See application file for complete search history.

(56) References Cited

U.S. PATENT DOCUMENTS

2002/0076182 A1* 6/2002 Terahara .......... H04B 10/25253
385/122
2002/0105715 A1* 8/2002 Naito ..................... H01S 3/302
359/334

(Continued)

FOREIGN PATENT DOCUMENTS

CN       103946744 A     7/2014
EP       2 784 576 A1    10/2014
(Continued)

OTHER PUBLICATIONS

European Office Action dated Mar. 16, 2020 in corresponding European Patent Application No. 16 890 564.4, 4 pages.
(Continued)

*Primary Examiner* — Eric L Bolda
(74) *Attorney, Agent, or Firm* — Oblon, McClelland, Maier & Neustadt, L.L.P.

(57) ABSTRACT

An excitation light source apparatus includes: an excitation light source to generate Raman excitation light in a drive state and to stop generating the Raman excitation light in a stop state; a light source controller to control the intensity of the Raman excitation light in the drive state; a light level measuring instrument to measure the light level of signal light; a logarithmic converter to convert at least one measurement result of measuring by the light level measuring instrument to a logarithmic value; and a main controller to decide a correction value based on the logarithmic value of the at least one measurement result in the stop state. The main controller controls the light source controller by using the correction value and a preset gain control target value.

20 Claims, 13 Drawing Sheets

(51) Int. Cl.
*H01S 3/30* (2006.01)
*G02F 1/35* (2006.01)

(56) References Cited

U.S. PATENT DOCUMENTS

| | | |
|---|---|---|
| 2004/0196158 A1 | 10/2004 | Sugaya et al. |
| 2005/0024712 A1 | 2/2005 | Hiraizumi et al. |
| 2008/0123180 A1* | 5/2008 | Nakata .................. H01S 3/302 359/334 |
| 2011/0141552 A1* | 6/2011 | Ghera ................ H04B 10/2916 359/334 |
| 2014/0253998 A1* | 9/2014 | Otani ................. H01S 3/13013 359/341.41 |

FOREIGN PATENT DOCUMENTS

| | | |
|---|---|---|
| JP | 3527627 B2 | 5/2004 |
| JP | 2004-287307 A | 10/2004 |
| JP | 2006-189465 A | 7/2006 |
| JP | 2013-74456 A | 4/2013 |
| WO | WO 2013/077434 A1 | 5/2013 |

OTHER PUBLICATIONS

Combined Chinese Office Action and Search Report dated Jun. 30, 2020 in corresponding Chinese Patent Application No. 201680080944.1 (with English Translation and English Translation of Category of Cited Documents) 18 pages.
Office Action dated Feb. 12, 2019 in Japanese Patent Application No. 2017-567912 with unedited computer generated English translation.

\* cited by examiner

FIG. 4

| | | | | | | | | | | | | | |
|---|---|---|---|---|---|---|---|---|---|---|---|---|---|
| 1 | Pin [dBm] | -28.44 | -28.44 | -28.44 | -28.44 | -28.44 | -28.44 | -28.44 | -28.44 | -28.44 | -28.44 | -28.44 | -28.44 |
| 2 | Gain [dB] | 1.11 | 2.04 | 2.92 | 3.92 | 5.09 | 6.62 | 8.30 | 10.16 | 12.17 | 14.18 | 16.11 | 16.69 |
| 3 | Ptotal [dBm] | -27.14 | -26.06 | -25.05 | -23.98 | -22.66 | -21.09 | -19.41 | -17.56 | -15.59 | -13.66 | -11.72 | -11.13 |
| 4 | Psig [dBm] | -27.33 | -26.40 | -25.52 | -24.52 | -23.35 | -21.82 | -20.14 | -18.28 | -16.27 | -14.26 | -12.33 | -11.75 |
| 5 | CORRECTION VALUE [dBm] | 0.19 | 0.34 | 0.47 | 0.54 | 0.69 | 0.73 | 0.73 | 0.72 | 0.68 | 0.60 | 0.61 | 0.62 |
| 6 | Ptotal' [dBm] | -27.81 | -26.73 | -25.72 | -24.65 | -23.33 | -21.76 | -20.08 | -18.23 | -16.26 | -14.33 | -12.39 | -11.80 |
| 7 | ERROR E [dB] | -0.48 | -0.33 | -0.20 | -0.13 | 0.02 | 0.06 | 0.06 | 0.05 | 0.01 | -0.07 | -0.06 | -0.05 |

FIG. 6

| | | | | | | | | | | | | |
|---|---|---|---|---|---|---|---|---|---|---|---|---|
| 1 | Pin [dBm] | -17.03 | -19.00 | -21.03 | -23.00 | -25.00 | -27.00 | -29.00 | -31.00 | -33.00 | -35.00 | -37.00 | -39.00 |
| 2 | Gain [dB] | 9.84 | 9.97 | 10.09 | 10.16 | 10.37 | 10.66 | 10.63 | 10.66 | 10.76 | 10.86 | 10.08 | 9.98 |
| 3 | Psig [dBm] | -7.19 | -9.03 | -10.94 | -12.84 | -14.63 | -16.34 | -18.37 | -20.34 | -22.24 | -24.14 | -26.92 | -29.02 |
| 4 | Ptotal [dBm] | -7.10 | -8.89 | -10.72 | -12.49 | -14.09 | -15.50 | -17.09 | -18.42 | -19.29 | -19.71 | -20.53 | -19.18 |
| 5 | CORRECTION VALUE A1 [dB] | 0.09 | 0.14 | 0.22 | 0.35 | 0.54 | 0.84 | 1.28 | 1.92 | 2.95 | 4.43 | 6.39 | 9.84 |
| 6 | CONSTANT VALUE K [W] | $4.15 \times 10^{-4}$ | $4.12 \times 10^{-4}$ | $4.10 \times 10^{-4}$ | $4.21 \times 10^{-4}$ | $4.19 \times 10^{-4}$ | $4.26 \times 10^{-4}$ | $4.32 \times 10^{-4}$ | $4.42 \times 10^{-4}$ | $4.87 \times 10^{-4}$ | $5.61 \times 10^{-4}$ | $6.69 \times 10^{-4}$ | $1.09 \times 10^{-3}$ |
| 7 | CORRECTION VALUE A2 [dB] | 0.09 | 0.14 | 0.23 | 0.35 | 0.54 | 0.83 | 1.26 | 1.85 | 2.65 | 3.68 | 4.93 | 6.39 |
| 8 | Ptotal' [dBm] | -7.19 | -9.03 | -10.95 | -12.84 | -14.63 | -16.33 | -18.35 | -20.27 | -21.94 | -23.39 | -25.46 | -25.57 |
| 9 | ERROR E [dB] | 0.00 | 0.00 | 0.01 | 0.00 | 0.00 | -0.01 | -0.02 | -0.07 | -0.30 | -0.75 | -1.46 | -3.45 |

EXCITATION LIGHT SOURCE APPARATUS AND OPTICAL TRANSMISSION SYSTEM

TECHNICAL FIELD

The present invention relates to an excitation light source apparatus that outputs Raman excitation light for amplifying signal light and an optical transmission system including this excitation light source apparatus.

BACKGROUND ART

In general, an amplification device (optical amplifier) that amplifies a light signal by utilizing Raman amplification is introduced to elongate a relay distance, in a wavelength division multiplexing optical transmission system that transmits, over a long distance, a light signal (signal light) to which wavelength division multiplexing (WDM: Wavelength Division Multiplexing) is performed. This amplification device amplifies the signal light by outputting Raman excitation light to a transmission path to compensate for level reduction caused by transmission, thereby making it possible to elongate the relay distance. The level reduction mentioned here means that the light level (signal light level) of the signal light decreases according to the transmission distance.

An optical amplifier in an optical transmission system not only amplifies signal light, but also monitors signal light level, and can perform control with a control method such as a constant gain control method for controlling gain to a constant value or a constant light level control method for controlling the light level to a constant value. In a wavelength division multiplexing optical transmission system, it is necessary to control the light level per wavelength included in wavelength multiplexed light to be a constant value, and thus the constant gain control method that can provide a constant gain without depending on the wavelength of input signal light is widely used.

Unlike an Erbium-Doped Fiber Amplifier (EDFA), a Raman amplifier has a feature that is capable of changing amplification gain by changing the intensity of Raman excitation light, without impairing the flatness of the gain, thereby being used as a variable gain optical amplifier that can set the amplification gain to an arbitrary value.

In general, the monitoring of the signal light level is performed by monitoring the total light level of the signal light (the summation of the main signal light level and the noise light level), by using a branch coupler and a PD (Photo Diode). After amplification, the signal light level changes to the signal light level approximately a thousand times larger than that before the amplification in some cases, due to transmission line loss, optical amplification gain, or the like, and a range of values of the signal light level can be extremely large. Thus, in general, the signal light level value detected by the PD is converted to, for example, a logarithmic value in unit of [dBm], by using a log amplifier or the like, to perform gain control.

On the other hand, in the optical amplifier such as the EDFA and the Raman amplifier, spontaneous emission optical noise is generated with the optical amplification, in principle. When the optical amplification control is performed, it is necessary to accurately detect the light level of the main signal light in the signal light, and to perform the optical amplification based on the detection result, regardless of the generation amount of such noise light. A transmission error can occur, when the optical amplification control is performed on the basis of the signal light level including the noise light component (the summation of the main signal light level and the noise light level).

For example, if the main signal light level is low and the noise light level is high, the light level necessary for a downstream station to receive the main signal is not ensured, resulting in occurrence of a transmission error or prevention of relay distance elongation, when the main signal light level to be transmitted is assumed to be sufficiently amplified and is transmitted to the downstream station.

In order to solve this problem, a rare-earth-doped optical fiber amplifier is disclosed which stores the light level of the noise component included in the light signal and subtracts it from the total light level of the light signal, thereby calculating the light level of only the main signal component included in the light signal (for example, refer to patent reference 1).

However, when the light level is expressed as a logarithmic value [dBm], it is necessary to subtract the noise light level [dBm] (or [mW]) measured in advance, from the total light level [dBm], to perform noise light correction. In this case, in order to subtract the noise light level, it is necessary to calculate a linear value in unit of [mW] or the like by transforming the logarithmic value in unit of [dBm] or the like with inverse logarithmic transformation and to transform the subtracted linear value into a value in unit of [dBm] or the like with logarithmic transformation again, for example. In order to perform this process, computation such as logarithmic transformation is necessary, and thus an expensive control device with high processing ability is necessary.

In order to simplify the computation such as logarithmic transformation, there is a method for subtracting the noise light level from the total light level, by using a reference table storing the noise light level corresponding to the input light level (or the output light level). However, in a Raman amplifier that operates by setting gain to an arbitrary value, the generated noise light level varies according to the gain value, and thus it is necessary to use a reference table corresponding to both of the input light level (or the output light level) and the Raman gain. This method requires a database of large capacity in the Raman amplifier. Further, even the Raman amplifier that includes such a database of large capacity has a problem of requiring a complicated process for selecting an optimal value from the database (reference table).

Patent reference 2 discloses an optical amplifier that performs gain control in which the above influence of the noise light is corrected. In this optical amplifier, before the operation of the optical communication system, Raman excitation light is output to a transmission path while signal light is not transmitted to the transmission path, and a correlative relationship between the intensity of the excitation light output to the transmission path and the noise light level is measured. During the operation of the optical communication system, this optical amplifier acquires the noise light level in the operation on the basis of the correlative relationship between the excitation light intensity and the noise light level measured in advance, and performs the gain control in which the influence of the noise light is corrected.

However, in the optical amplifier described in patent reference 2, since it is necessary to output the Raman excitation light to the transmission path while the signal light is not transmitted to the transmission path, a process for interrupting reception of the signal light is forced while the signal light is transmitted to the transmission path, and there is a problem of a complicated process of starting the optical amplifier. Further, in the optical amplifier described in patent reference 2, it is necessary to measure the correlative relationship between the excitation light intensity and the noise light generation amount, and there is a problem of requiring complicated control. Further, when the light level is expressed as a logarithmic value [dBm], it is necessary to subtract the noise light level [dBm] measured in advance, from the light level [dBm] amplified by the Raman excitation light, in order to perform the noise light correction, and thus an expensive control device with high processing ability for performing computation such as logarithmic transformation is necessary.

Patent reference 3 discloses an optical amplifier that performs gain control in which the influence of the noise light is corrected, without necessitating a complicated process such as a complicated start-up process in the optical amplifier or a measurement process of the correlative relationship between the excitation light intensity and the noise light generation amount. This optical amplifier includes a wavelength filter for separating a part of noise light and a measuring instrument for measuring the separated light, calculates the light level of the entire noise light from the light level of the part of the noise light which has been measured, and performs gain control with consideration given to the influence of the noise light.

PRIOR ART REFERENCE

Patent Reference

PATENT REFERENCE 1: Japanese Patent Application Publication No. 11-112434
PATENT REFERENCE 2: Japanese Patent Application Publication No. 2004-287307
PATENT REFERENCE 3: International Publication No. WO 2013/077434

SUMMARY OF THE INVENTION

Problem to be Solved by the Invention

However, the optical amplifier described in patent reference 3 requires an exclusive wavelength filter and an exclusive measuring instrument and there is a problem of increasing the size and the cost of the optical amplifier. There is another problem: since noise light detected by the wavelength filter and the measuring instrument includes noise light transmitted from an upstream station, when noise light level is included in signal light level transmitted from the upstream station, an error can occur in calculation of the noise light level. There is further another problem: when the light level is expressed as a logarithmic value [dBm] in the same way as patent reference 2, in order to perform noise light correction, it is necessary to subtract noise light level [dBm] measured in advance from light level [dBm] amplified by Raman excitation light, and thus an expensive control device of high processing ability for performing computation such as logarithmic transformation is required.

Thus, the present invention is made to solve the above problem, and has a purpose of providing an excitation light source apparatus and an optical transmission system that perform gain control with consideration given to the influence of noise light caused by Raman amplification, with a simple configuration.

Means of Solving the Problem

An excitation light source apparatus of the present invention is an excitation light source apparatus for outputting Raman excitation light for amplifying signal light, to a transmission path through which the signal light is transmitted. The excitation light source apparatus includes an excitation light source to generate the Raman excitation light in a drive state and to stop generating the Raman excitation light in a stop state; a light source controller to control intensity of the Raman excitation light in the drive state; a light level measuring instrument to measure a light level of the signal light input into the excitation light source apparatus; a logarithmic converter to convert at least one measurement result of measuring by the light level measuring instrument to a logarithmic value; and a main controller to decide a correction value based on the logarithmic value of the at least one measurement result in the stop state. The main controller controls the light source controller by using the correction value and a preset gain control target value.

An optical transmission system of the present invention is an optical transmission system including a transmission path through which signal light is transmitted, and an excitation light source apparatus to output Raman excitation light for amplifying the signal light to the transmission path, the excitation light source apparatus including: an excitation light source to generate the Raman excitation light in a drive state and to stop generating the Raman excitation light in a stop state; a light source controller to control intensity of the Raman excitation light in the drive state; a light level measuring instrument to measure a light level of the signal light input into the excitation light source apparatus; a logarithmic converter to convert at least one measurement result of measuring by the light level measuring instrument to a logarithmic value; and a main controller to decide a correction value based on the logarithmic value of the at least one measurement result in the stop state. The main controller controls the light source controller by using the correction value and a preset gain control target value.

Effects of the Invention

According to the present invention, it is possible to perform gain control with consideration given to the influence of the noise light caused by the Raman amplification, with a simple configuration.

BRIEF DESCRIPTION OF THE DRAWINGS

FIG. 4 is a diagram illustrating various experiment data when an input light level (Pin) in an unexcited state is set to a constant value, and a Raman gain (Gain) is changed.
FIG. 6 is a diagram illustrating various experiment data when the Raman gain (Gain) is set to a constant value, and the input light level (Pin) in the unexcited state is changed.

MODE FOR CARRYING OUT THE INVENTION

First Embodiment

Figure 1:
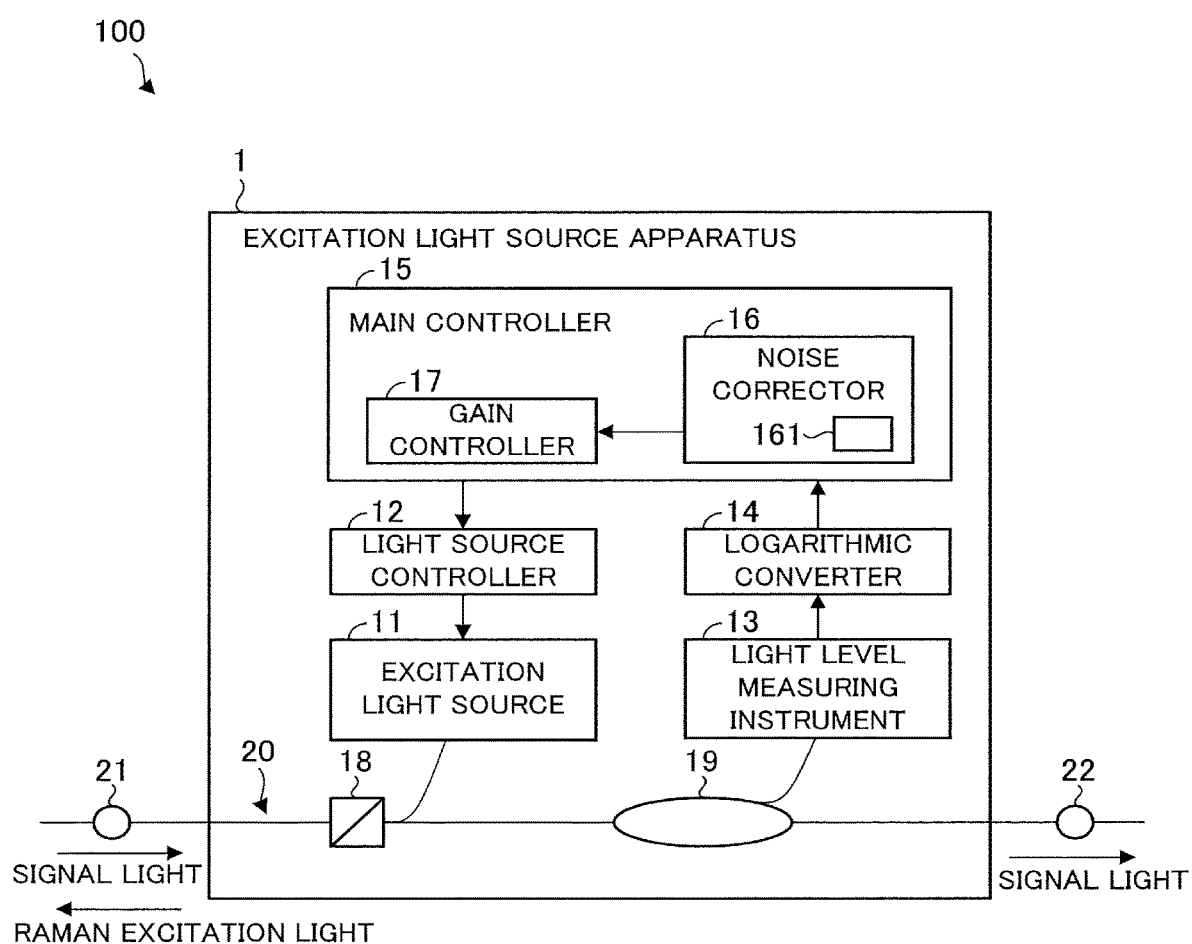
FIG. 1 is a block diagram schematically illustrating a configuration example of an optical transmission system that includes an excitation light source apparatus according to a first embodiment of the present invention.

FIG. 1 is a block diagram schematically illustrating a configuration example of an optical transmission system 100 that includes an excitation light source apparatus 1 according to a first embodiment of the present invention. The optical transmission system 100 includes an excitation light source apparatus 1 and a transmission path 20.

The excitation light source apparatus 1 illustrated in FIG. 1 includes an excitation light source 11, a light source controller 12, a light level measuring instrument 13, a logarithmic converter 14, a main controller 15, a multiplexer 18, and a branching device 19. In the present embodiment, the excitation light source apparatus 1 is a Raman amplifier.

The multiplexer 18 and the branching device 19 are connected to each other by the transmission path 20. In the present embodiment, the transmission path 20 is an optical fiber. However, it may be a light transmission path that is not the optical fiber.

The excitation light source apparatus 1 further includes a port 21 and a port 22. Signal light that flows on the transmission path 20 is input (received) from the port 21 of the excitation light source apparatus 1, and is output from the port 22.

The excitation light source apparatus 1 outputs Raman excitation light (also referred to as "excitation light") generated by the excitation light source 11, to the transmission path 20 through which the signal light is transmitted. The excitation light output from the excitation light source 11 is output from the port 21 to the outside of the excitation light source apparatus 1 (for example, the transmission path 20).

Next, each component of the excitation light source apparatus 1 will be described.

The excitation light source 11 generates the excitation light for amplifying the signal light in the transmission path 20. The excitation light source 11 generates the excitation light in a drive state (excited state) of the excitation light source 11, and stops generating the excitation light in a stop state (unexcited state) of the excitation light source 11. The signal light amplified by the excitation light includes main signal light and noise light.

The light source controller 12 controls the intensity (excitation light intensity) of the excitation light generated by the excitation light source 11 in the drive state, on the basis of control of the main controller 15 (for example, a gain controller 17). The light source controller 12 can be configured with an FPGA (Field Programmable Gate Array), for example. The light source controller 12 controls the excitation light intensity by controlling an electric current supplied to the excitation light source 11, and controls the electric current so that the excitation light intensity is maintained constant while the excitation light is generated.

The multiplexer 18 multiplexes light (for example, the Raman excitation light and the signal light) input from two lines.

The branching device 19 branches a part of the signal light (input signal light) input into the excitation light source apparatus 1, and outputs the signal light to two lines.

The light level measuring instrument 13 measures the light level (also referred to as "input light level") of the signal light input into the excitation light source apparatus 1. The signal light measured by the light level measuring instrument 13 in the drive state of the excitation light source 11 includes the main signal light and the noise light.

The logarithmic converter 14 converts at least one measurement result, such as the light level measured by the light level measuring instrument 13, to a logarithmic value. The logarithmic value generated by the logarithmic converter 14 is transmitted to the main controller 15 (for example, a noise corrector 16). The logarithmic converter 14 may convert each of a plurality of measurement results of measuring by the light level measuring instrument 13 to a logarithmic value.

The main controller 15 includes the noise corrector 16 and the gain controller 17. The main controller 15 decides a correction value (noise correction value) based on the logarithmic value of the measurement result of measuring by the light level measuring instrument 13 in the stop state of the excitation light source 11, and controls the light source controller 12 by using the decided correction value and a preset gain control target value G0. It is desirable that the gain control target value G0 does not include a significantly small range and does not cover a significantly wide range. Specifically, it is desirable to be within the range of 4 dB or more and 16 dB or less.

In the present embodiment, the measurement result of measuring by the light level measuring instrument 13 in the drive state of the excitation light source 11 is referred to as "measurement result in the drive state". Further, the measurement result of measuring by the light level measuring instrument 13 in the stop state of the excitation light source 11 is referred to as "measurement result in the stop state".

In the main controller 15, noise light correction for calculating a corrected light level value is performed by the noise corrector 16.

Figure 2:
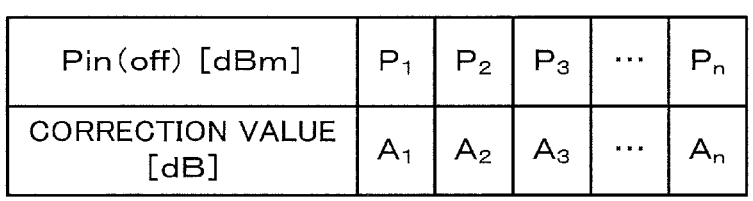
FIG. 2 is a diagram illustrating an example of a reference table.

FIG. 2 is a diagram illustrating an example of a reference table 161.

The noise corrector 16 has the reference table 161. The reference table 161 is a table for deciding a correction value (noise correction value) for correcting the influence of the noise light generated due to the Raman amplification in the gain control. Specifically, correction values corresponding to logarithmic values of the measurement results in the stop state of the excitation light source 11 are stored in the reference table 161. The reference table 161 is not limited to the example illustrated in FIG. 2, it is sufficient to be within the scope that no deviation from the function as the reference table is caused and various reference tables can be used.

A column in the first row of the reference table 161 indicates Pin(off) (=Pn; n is an integer equal to or greater than 1) representing the input light level in the unexcited state expressed by a logarithmic value in unit of [dBm]. A column in the second row of the reference table 161 indicates a correction value (correction coefficient) An (n is an integer equal to or greater than 1) corresponding to Pin(off), in unit of [dB].

The correction values stored in the reference table 161 are predetermined values. As described later, the correction values can be calculated by using a measured value measured by an optical power meter and a measured value measured by using an optical spectrum analyzer, for example.

The noise corrector 16 corrects the influence of the noise light generated by the Raman amplification, in the gain control. Specifically, the noise corrector 16 calculates a corrected light level value, by subtracting the correction value from the logarithmic value of the measurement result in the drive state of the excitation light source 11, in the gain control.

In the main controller 15, the control over the light source controller 12 is performed by the gain controller 17.

The gain controller 17 controls the light source controller 12 by using the correction value based on the logarithmic value of the measurement result in the stop state and the gain control target value G0. Specifically, the gain controller 17 calculates the corrected light level value, by subtracting the correction value from the logarithmic value of the measurement result in the drive state. Further, the gain controller 17 controls the light source controller 12, so that the difference between the corrected light level value and the logarithmic value of the measurement result in the drive state gets closer to the gain control target value G0.

The difference between the corrected light level value and the logarithmic value of the measurement result in the stop state indicates a Raman gain G1 at the current time point in the excitation light source apparatus 1. The gain control target value G0 is a control target value of the Raman gain indicated by the ratio between the light level of the main signal light input into the excitation light source apparatus 1 in the stop state of the excitation light source 11 and the light level of the main signal light input into the excitation light source apparatus 1 in the drive state of the excitation light source 11. In the present embodiment, an arbitrary gain control target value G0 is set in advance in the excitation light source apparatus 1. Thus, the light source controller 12 generates the excitation light, so that the Raman gain G1 gets closer to the gain control target value G0. However, the gain control target value G0 may be changed during the operation of the excitation light source apparatus 1.

The Raman gain G1 is calculated by the gain controller 17, in the main controller 15. In the present embodiment, the Raman gain G1 is not a general gain expressed by the ratio between the input light level and the output light level, but is expressed by the ratio between the input light level in the unexcited state and the input light level in the excited state. That is, in the present embodiment, the Raman gain G1 indicates a gain given to the main signal light as a Raman amplification effect generated in the transmission path 20.

Next, the operation of the gain control by the excitation light source apparatus 1 will be described while referring to FIG. 3.

Figure 3:
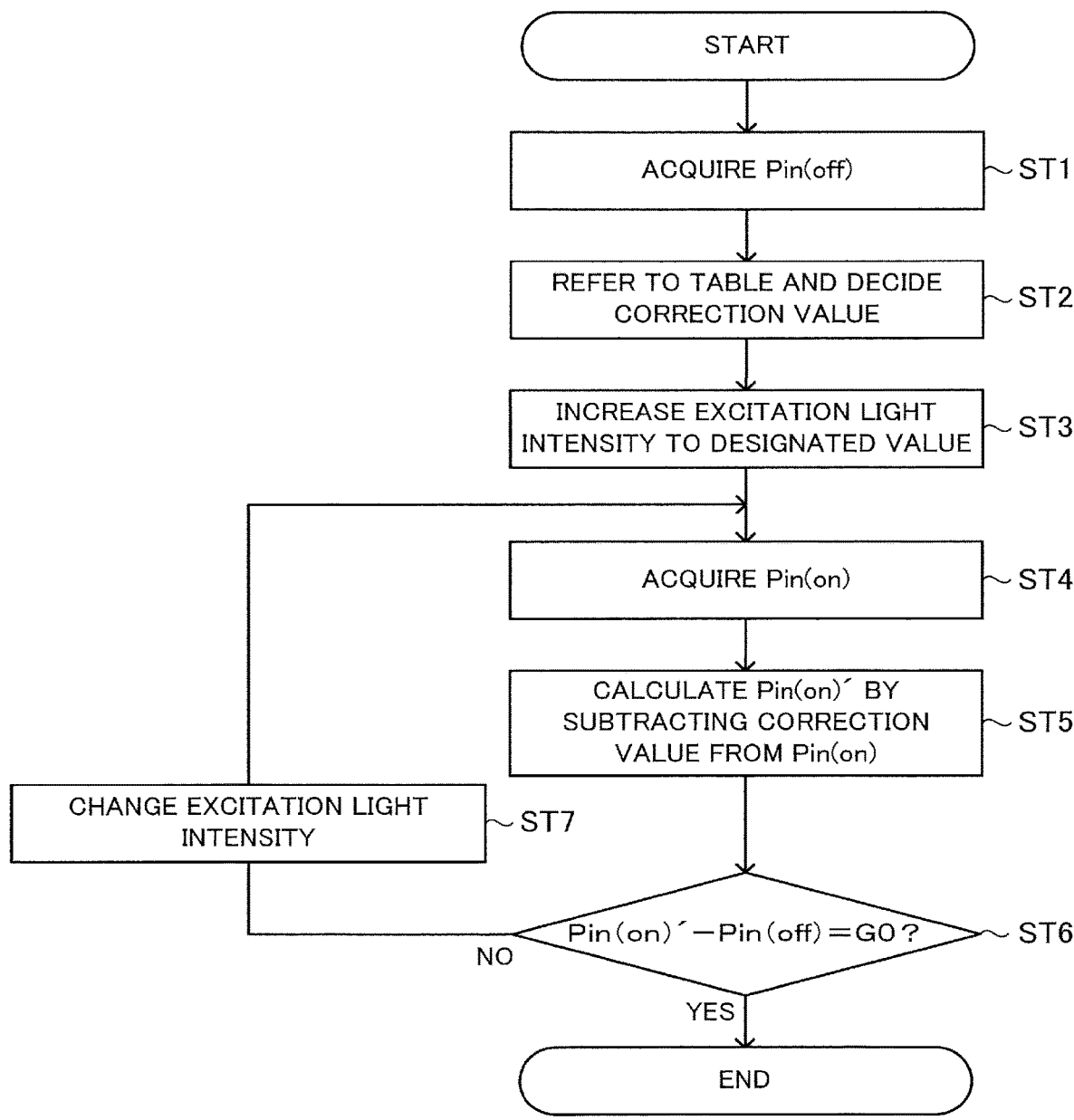
FIG. 3 is a flowchart illustrating an example of gain control by the excitation light source apparatus.

FIG. 3 is a flowchart illustrating an example of the gain control by the excitation light source apparatus 1.

In the present embodiment, the process illustrated in FIG. 3 is always executed, while the signal light is received from the port 21 of the excitation light source apparatus 1. However, the process illustrated in FIG. 3 may be stopped at an arbitrary time point.

In step ST1, the light level measuring instrument 13 measures the light level of the input signal light, in the stop state (unexcited state) of the excitation light source 11.

In step ST1, information on the measured light level (first measurement result) is converted to a logarithmic value Pin(off) (the logarithmic value of the first measurement result) by the logarithmic converter 14, and the converted value Pin(off) is transmitted to the noise corrector 16 and the gain controller 17 of the main controller 15. The main controller 15 acquires Pin(off) from the logarithmic converter 14. In the present embodiment, the logarithmic value of the measurement result (the light level of the input signal light) of measuring by the light level measuring instrument 13 in the unexcited state is referred to as "Pin(off)". It is desirable that Pin(off) does not include a significantly small range. Specifically, it is desirable that Pin(off) be within a range of −35.00 dBm or more. Further, it is more desirable that Pin(off) be within a range of −31.00 dBm or more.

In step ST2, the noise corrector 16 of the main controller 15 refers to the reference table 161 and decides a correction value on the basis of the transmitted Pin(off). Specifically, the noise corrector 16 decides the correction value corresponding to the transmitted Pin(off), from a plurality of Pin(off) stored in the reference table 161. When the transmitted Pin(off) is not stored in the reference table 161, the noise corrector 16 may decide the correction value corresponding to the closest value from the plurality of Pin(off) stored in the reference table 161.

In step ST3, the gain controller 17 controls the light source controller 12 to generate the excitation light, and the light source controller 12 increases the excitation light intensity of the excitation light source 11 to a designated value. However, a start of driving the excitation light source 11 may be controlled by another element (for example, the main controller 15).

In step ST4, the light level measuring instrument 13 measures the light level of the input signal light, in the drive state (excited state) of the excitation light source 11.

Information on the measured light level (second measurement result) in the excited state is converted to a logarithmic value Pin(on) (the logarithmic value of the second measurement result) by the logarithmic converter 14, and the converted value Pin(on) is transmitted to the noise corrector 16. The main controller 15 acquires Pin(on) from the logarithmic converter 14. In the present embodiment, the logarithmic value of the measurement result (the light level of the input signal light) of measuring by the light level measuring instrument 13 in the excited state is referred to as "Pin(on)".

In step ST5, the noise corrector 16 calculates a corrected light level value Pin(on)' (first corrected light level value), by subtracting the correction value decided in step ST2 from Pin(on) transmitted in step ST4. The calculated Pin(on)' is transmitted to the gain controller 17.

In step ST6, the gain controller 17 of the main controller 15 calculates a Raman gain G1 at the current time point in the excitation light source apparatus 1, by using the difference (Pin(on)'−Pin(off)) between Pin(on)' transmitted in step ST5 and Pin(off) transmitted in step ST1, and compares the calculated Raman gain G1 and the gain control target value G0.

In this step ST6, if the gain controller 17 determines that the gain control target value G0 and the Raman gain G1 are not identical ("NO" in step ST6), the process proceeds to step ST7.

In step ST7, the gain controller 17 controls the light source controller 12 to change the excitation light intensity of the excitation light source 11 according to the difference between the gain control target value G0 and the Raman gain G1. Although an arbitrary value can be designated as the change amount of the excitation light intensity, it is desirable that the gain controller 17 control the light source controller 12 so that the difference (i.e., the Raman gain G1) between Pin(on)' and Pin(off) gets closer to the gain control target value G0. Accordingly, it is possible to promptly complete the gain control.

After step ST7, the process proceeds to step ST4, and the above processes are performed.

On the other hand, if it is determined that the gain control target value G0 and the Raman gain G1 are identical in step ST6 ("YES" in step ST6), the flow of the gain control illustrated in FIG. 3 ends.

As described above, in step ST6, it is determined whether or not the gain control target value G0 and the Raman gain G1 are identical. However, it is not limited to this determination method; by setting a range of the difference that is assumed to be identical as a determination condition, the determination may be made by determining that the gain control target value G0 and the Raman gain G1 are identical if the difference between the gain control target value G0 and the Raman gain G1 is within the range of the determination condition.

As described above, in step ST6, the gain control ends if it is determined that the gain control target value G0 and the Raman gain G1 are identical. However, it is not limited to this method; the difference between the gain control target value G0 and the Raman gain G1 may be monitored cyclically, and the light source controller 12 may continue controlling the excitation light intensity. In this case, a precondition is that the input light level Pin(off) in the unexcited state does not change due to increase and decrease of the wavelength, fluctuation of the state of the transmission path 20, or the like.

As described above, in step ST6, the gain control ends if it is determined that the gain control target value G0 and the Raman gain G1 are identical. However, it is not limited to this method; by setting a limit value on the number of trial times or a trial time for the gain control, the gain control may be ended if it exceeds the limit value.

If it is determined that the gain control target value G0 and the Raman gain G1 are identical in step ST6, the gain controller 17 may store control information on the light source controller 12 and continue controlling the light source controller 12 in accordance with the stored control information. Here, although the control information stored in the gain controller 17 and the control target of the gain controller 17 may be either the excitation light intensity or the current value of the excitation light source 11, it is more desirable to use the excitation light intensity as the control target. If the excitation light intensity input into the transmission path 20 is constant, the Raman gain is a constant value (however, except a case in which the input light level in the excited state is approximately the same as the excitation light intensity) regardless of the wavelength of the input signal, as long as loss fluctuation, such as bending, does not occur in the transmission path 20.

Next, a fact that, in the excitation light source apparatus 1, noise light correction can be performed with a simple configuration, by using a correction value (a correction value expressed by a logarithmic value) that does not depend on the Raman gain but depends on the input light level in the unexcited state only will be described.

The noise light level (Pase) indicating the light level of the noise light generated by the Raman amplification is proportional to the Raman gain (Gain), and thus is expressed by following equation (1) by using a constant (K).

$$Pase[W] = Gain[W/W] \times K[W] \quad (1)$$

On the other hand, the light level (Psig) of the main signal light amplified by the Raman amplification is proportional to Gain and the light level (Pin) of the input signal light in the unexcited state, and thus is expressed by following equation (2).

$$Psig[W] = Gain[W/W] \times Pin[W] \quad (2)$$

Here, Psig does not include the light level of the noise light component generated by the Raman amplification.

The total light level (Ptotal) indicating the light level of the signal light measured by the light level measuring instrument 13 in the excited state is the summation of Pase and Psig, and thus is expressed by following equation (3).

$$Ptotal[W] = Psig[W] + Pase[W] = Gain[W/W](Pin[W] + K[W]) \quad (3)$$

When equation (3) is converted to the logarithmic value, following equation (4) is obtained.

$$\begin{aligned} Ptotal\_dBm[dBm] &= 10\log\{Gain[W/W](Pin[W] + K[W])\} \quad (4) \\ &= 10\log(Gain[W/W]) + 10\log(Pin[W] + K[W]) \\ &= Gain\_dB[dB] + Pin\_dBm[dBm] + \\ &\quad 10\log(1 + K[W]/Pin[W]) \\ &= Psig\_dBm[dBm] + 10\log(1 + K[W]/Pin[W]) \end{aligned}$$

Here, the correction value $A_n$ for performing the noise light correction is the ratio (difference) between the total light level (Ptotal_dBm) indicated by Ptotal converted to the logarithmic value and the light level (Psig_dBm) indicated by Psig converted to the logarithmic value, and is expressed by following equation (5) from equation (4).

$$A_n[dB] = 10\log(1 + K[W]/Pin[W]) \quad (5)$$

From equation (5), it is known that the correction value $A_n$ for performing the noise light correction is a value that depends on Pin only and does not depend on Gain. Since the correction value $A_n$ is a ratio expressed by the logarithmic values, when the light level is expressed by using the logarithmic value in units of [dBm] or the like, the main controller 15 can perform the noise light correction with simple computation such as subtraction, without requiring processing such as logarithmic transformation in the main controller 15.

In the first embodiment, this phenomenon is focused, the noise light correction is performed by using the correction value that depends only on the input light level in the unexcited state and does not depend on the Raman gain, and thus the gain control of high accuracy can be performed. For example, if the input light level in the unexcited state is constant even when the gain control target value G0 is changed from 6 dB to 15 dB, the gain control with consideration given to the influence of the noise light can be performed by subtracting the same correction value from the input light level in the excited state.

Next, a specific method for acquiring the correction value $A_n$ will be described.

As described above, the correction value $A_n$ is the value indicating the ratio between Ptotal and Psig. Thus, the correction value $A_n$ can be acquired by measuring Ptotal and Psig.

First, a method for measuring Ptotal will be described. For the measurement, an input light source, an arbitrary transmission path fiber (for example, optical fiber), the excitation light source apparatus, a branching device, and an optical power meter are used.

A configuration for the measurement of Ptotal will be described. One end of the transmission path fiber is connected to the input light source. The other end of the transmission path fiber is connected to the excitation light source apparatus and the optical power meter via the branching device. Regarding a branching ratio at the branching device, it is desirable to make a ratio of branching to the excitation light source apparatus side larger, in order to avoid attenuation of the Raman excitation light.

Next, a procedure for measuring Ptotal will be described.

The input light source inputs the signal light of an arbitrary wavelength and light level into the transmission path fiber. The excitation light source apparatus inputs the Raman excitation light of an arbitrary intensity into the transmission path fiber, to cause the Raman amplification. In that state, Ptotal can be acquired by measuring the light level displayed on the optical power meter. Note that Pin can be acquired by measuring the light level displayed on the optical power meter, while the Raman excitation light is stopped.

Next, a method for measuring Psig will be described.

The difference between the Psig measuring method and the Ptotal measuring method is only usage of an optical spectrum analyzer, instead of the optical power meter, for measuring the light level.

On the basis of a configuration and a procedure similar to those for measuring Ptotal, signal light of an arbitrary wavelength and light level is input into the transmission path fiber by using the input light source; Raman excitation light of an arbitrary intensity is input into the transmission path fiber by using the excitation light source apparatus, and thus Raman amplification occurs. In that state, Psig can be acquired by acquiring the peak power of the signal light displayed on the optical spectrum analyzer.

Although any type of transmission path fiber is used for measuring Ptotal and Psig, it is necessary for the length of the transmission path fiber to be a sufficient value (not less than an effective length of the Raman amplification) for the excitation light intensity.

Moreover, the intensity of the Raman excitation light input into the transmission path fiber at the time of the measurement is not limited particularly, but is desirably set to the intensity at the center of a Raman gain range used in an actual operation of the excitation light source apparatus 1. Moreover, in order to increase the accuracy, for the measurement of Ptotal and Psig, it is desirable to measure Raman excitation light intensity (Raman gain) not only at a certain point but at a plurality of points and to calculate an average value of these measurements.

Next, a method for acquiring the correction value $A_n$ corresponding to Pin will be described.

From above equation (5), the correction value $A_n$ corresponding to Pin can be acquired by calculating a constant value K.

A method for calculating the constant value K will be described.

Equation (5) is rewritten into following equation (6).

$$K[W]=P\text{in}[W](10^{An[dB]/10}-1) \quad (6)$$

The value of the constant value K can be calculated from equation (6), by calculating the correction value $A_n$, by using Pin measured at a certain point on the transmission path fiber. That is, the value of the constant value K can be calculated, by substituting Pin obtained by the actual measurement and the correction value $A_n$ for equation (6). The correction value $A_n$ obtained by the actual measurement can be calculated by using the difference (Ptotal-Psig) between Ptotal measured by using the optical power meter and Psig measured by using the optical spectrum analyzer, for example.

Further, the correction value $A_n$ corresponding to the arbitrary Pin can be calculated, by substituting the calculated constant value K for equation (5).

Next, a range of the Raman gain (Gain) achieving the noise correction is successful will be described by using actual measurement results.

FIG. 4 is a diagram illustrating various experiment data (data expressed by logarithmic values) when the input light level (Pin) in the unexcited state is set to a constant value and the Raman gain (Gain) is changed.

The input light level (Pin [dBm]) in the unexcited state indicated in the first row of the table in FIG. 4 is based on a value measured by the optical power meter. As illustrated in FIG. 4, the present measurement is performed by fixing the input light level in the unexcited state to −28.44 dBm.

The Raman gain (Gain [dB]) indicated in the second row of the table in FIG. 4 is set within a range between 1.11 dB and 16.69 dB. As described above, Gain [dB] is a ratio (difference) between Pin and Psig.

The total light level (Ptotal [dBm]) indicated in the third row of the table in FIG. 4 is based on a value measured by the optical power meter. As described above, Ptotal is the summation of Pase and Psig.

Psig [dBm] indicated in the fourth row of the table in FIG. 4 is a value measured by the optical spectrum analyzer, and indicates the light level of the main signal light amplified by the Raman amplification.

The correction value [dB] indicated in the fifth row of the table in FIG. 4 is a value calculated by using the difference between the measured value Ptotal [dBm] and the measured value Psig [dBm], and indicates the ratio between Ptotal [dBm] and Psig [dBm].

The corrected light level value (Ptotal' [dBm]) is indicated in the sixth row of the table in FIG. 4. Specifically, Ptotal' is a value calculated by subtracting the average value Aave=0.67 [dB] of a plurality of correction values (except correction values corresponding to Gain [dB]=1.11, 2.04, 2.92, and 3.92) indicated in the fifth row of the table of FIG. 4, from the measured value Ptotal [dBm]. That is, the calculated Ptotal' indicates an approximation value of the light level of the amplified main signal light.

The error E [dB] indicated in the seventh row in FIG. 4 is a value calculated by using the difference between Ptotal' [dBm] and Psig [dBm]. As illustrated in FIG. 4, −0.13 dB≤E≤0.06 dB is established when 3.92 dB≤Gain≤16.69 dB. Thus, when 3.92 dB≤Gain≤16.69 dB, the error between the approximation value Ptotal' and the measured value Psig is small, and the approximation value Ptotal' is effective. Further, −0.10 dB≤E≤0.06 dB is established when 5.09 dB≤Gain≤16.69 dB, as illustrated in FIG. 4. Thus, when 5.09 dB≤Gain≤16.69 dB, the range of the error E is within the range of ±0.10 dB, the error between the approximation value Ptotal' and the measured value Psig is very small, and thus it indicates that the approximation value Ptotal' is more effective.

Figure 5:
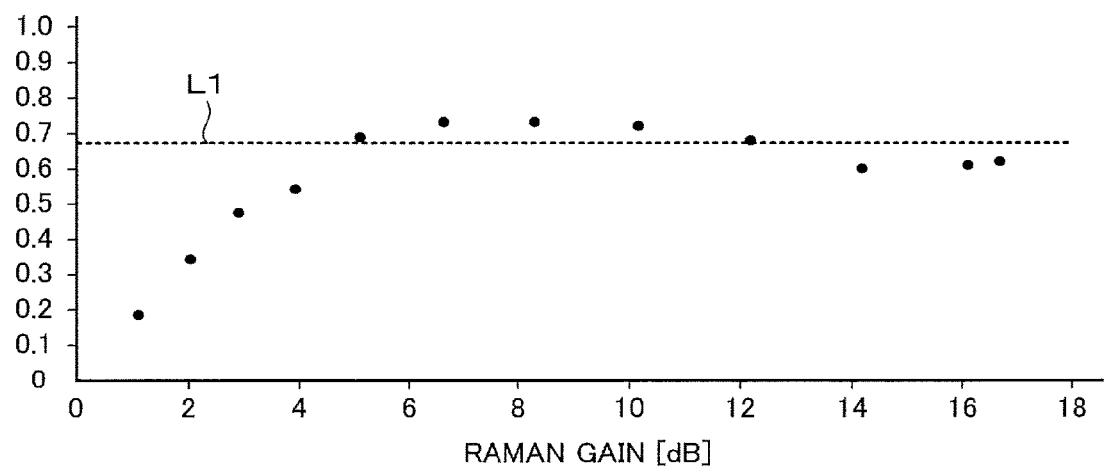
FIG. 5 is a diagram illustrating a relationship between Raman gain (Gain) illustrated in FIG. 4 and a correction value illustrated in FIG. 4.

FIG. 5 is a diagram illustrating the relationship between the Raman gain (Gain [dB]) illustrated in FIG. 4 and the correction value illustrated in FIG. 4 [dB]. A dashed line L1 illustrated in FIG. 5 indicates the average value Aave=0.67 dB of the correction values when 5.09 dB≤Gain≤16.69 dB illustrated in FIG. 4.

As illustrated in FIG. 5, the correction value does not depend on the magnitude of the Raman gain, except when the Raman gain is small (for example, 1.11 dB≤Gain≤3.92 dB). The correction value depends only on Pin, as described later.

As illustrated in FIGS. 4 and 5, the approximation value Ptotal' can be calculated within the error range of −0.13 dB≤E≤0.06 dB, except when the Raman gain is small (for example, 1.11 dB≤Gain≤2.92 dB). That is, the excitation light source apparatus 1 can perform the noise light correction (the calculation of the approximation value Ptotal') with the accuracy of −0.13 dB≤E≤0.06 dB, in the range of 3.92 dB≤Gain. Further, the excitation light source apparatus 1 can calculate the approximation value Ptotal' within the error range of −0.10 dB≤E≤0.06 dB, in the range of 5.09 dB≤Gain. That is, the excitation light source apparatus 1 can perform the noise light correction (the calculation of the approximation value Ptotal') with the accuracy of ±0.10 dB, in the range of 5.09 dB≤Gain.

In the excitation light source apparatus 1 according to the present embodiment, the noise light correction can be performed with high accuracy, except when the Raman gain is small, because equation (1) is an approximate formula regarding the gain of the Raman amplification in which the amplification is performed with distribution in the longitudinal direction of the transmission path 20. Specifically, equation (1) is not satisfied strictly when the Raman gain is small, and is satisfied when the Raman gain is equal to or greater than a certain constant value.

Next, a range of Pin achieving the noise correction (the approximation of the light level of the amplified main signal light) will be described by using actual measurement results.

FIG. 6 is a diagram illustrating various experiment data when the Raman gain (Gain) is set to a constant value (approximately 10 dB) and the input light level (Pin) in the unexcited state is changed. The data illustrated in FIG. 6 is expressed by logarithmic values, except for the constant value K.

The input light level (Pin [dBm]) in the unexcited state indicated in the first row of the table in FIG. 6 is based on values measured by using the optical power meter. As illustrated in FIG. 6, the present measurement is performed by changing Pin within the range between −17 dBm and −39 dBm.

The Raman gain (Gain [dB]) indicated in the second row of the table in FIG. 6 is set to approximately 10 dB. As described above, the Raman gain (Gain [dB]) is the ratio (difference) between Pin and the light level (Psig) of the main signal light amplified by the Raman amplification.

The total light level (Ptotal [dBm]) indicated in the fourth row of the table in FIG. 6 is based on the values measured by the optical power meter. As described above, Ptotal is the summation of the noise light level (Pase) indicating the light level of the noise light generated by the Raman amplification and Psig.

Psig [dBm] indicated in the third row of the table in FIG. 6 is measured by the optical spectrum analyzer, and indicates the light level of the main signal light amplified by the Raman amplification.

The correction value A1 [dB] indicated in the fifth row of the table in FIG. 6 is a value calculated by using the difference between the measured value Ptotal [dBm] and the measured value Psig [dBm], and indicates the ratio between Ptotal [dBm] and Psig [dBm]. As illustrated in FIG. 6, as Pin [dBm] becomes smaller, the correction value A1 [dB] becomes larger.

The constant value K [W] indicated in the sixth row of the table in FIG. 6 is a value calculated by substituting Pin [W] and the correction value A1 [dB] for equation (6). As illustrated in FIG. 6, the constant value K [W] is a substantially constant value, except when Pin [dBm] is small (for example, −33.00 dBm≤Pin≤−39.00 dBm).

The correction value A2 [dB] indicated in the seventh row of the table in FIG. 6 is a value calculated from equation (5). The constant value K [W] used in this calculation is the average value Kave=4.22×10$^{-4}$ [W] of a plurality of constant values K (except the constant values K corresponding to Pin [dBm]=−33.00, −35.00, −37.00, and −39.00) indicated in the sixth row of the table.

Ptotal' [dBm] indicated in the eighth row of the table in FIG. 6 is a value calculated by subtracting the correction value A2 [dB] indicated in the seventh row of the table of FIG. 6, from the measured value Ptotal [dBm]. That is, calculated Ptotal' [dBm] indicates an approximation value of the light level of the amplified main signal light.

The error E [dB] indicated in the ninth row of the table in FIG. 6 is a value calculated by using the difference between Ptotal' [dBm] and Psig [dBm]. As illustrated in FIG. 6, when −35.00 dBm≤Pin, −0.75 dB≤E≤0.01 dB is established. Thus, it indicates that when −35.00 dBm≤Pin, the error between the approximation value Ptotal' and the measured value Psig is small, and the approximation value Ptotal' is effective. Further, −0.07 dB≤E≤0.01 dB is established when −31.00 dBm≤Pin, as illustrated in FIG. 6. Thus, when −31.00 dBm≤Pin, the range of the error E is within the range of ±0.10 dB, the error between the approximation value Ptotal' and the measured value Psig is very small, and thus it indicates that the approximation value Ptotal' is more effective.

Figure 7:
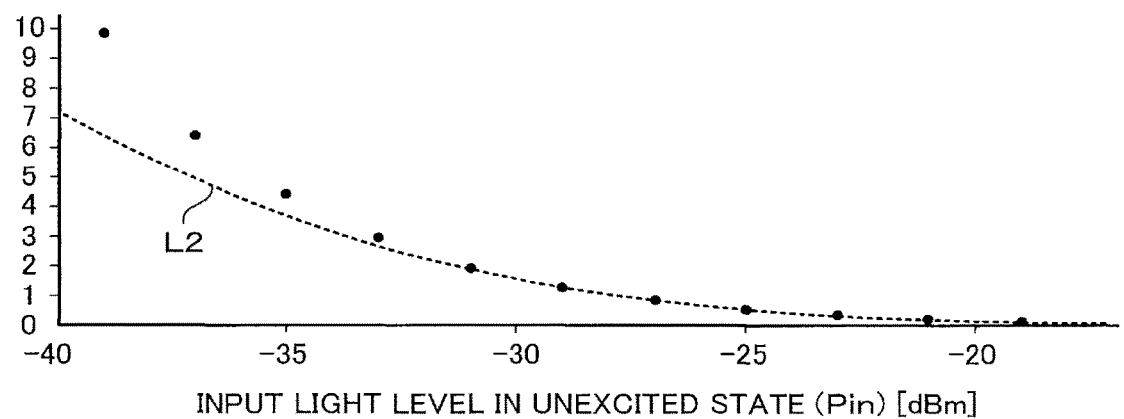
FIG. 7 is a diagram illustrating a relationship between the input light level in the unexcited state illustrated in FIG. 6 and a correction value in a fifth row of a table in FIG. 6.

FIG. 7 is a diagram illustrating a relationship between the input light level (Pin [dBm]) in the unexcited state illustrated in FIG. 6 and the correction value A1 [dB] in the fifth row of the table in FIG. 6. A dashed line L2 illustrated in FIG. 7 indicates an approximate curve based on the correction value A2 [dB] indicated in the seventh row of the table in FIG. 6.

As illustrated in FIG. 7, the difference between the dashed line L2 (i.e., the correction value A2 [dB]) and the correction value A1 [dB] is small, when −35.00≤Pin. Thus, it is possible to calculate the correction value A2 [dB] with high accuracy, even when the average value Kave of the constant values K is used, within the range of −35.00≤Pin. Further, the difference between the correction value A2 [dB] and the correction value A1 [dB] is smaller, when −31.00≤Pin. Thus, it is possible to calculate the correction value A2 [dB] with higher accuracy, even when the average value Kave of the constant values K is used, within the range of −31.00 Pin.

Thus, it indicates that the excitation light source apparatus 1 can perform the noise light correction (for example, the calculation of the correction value A2 [dB] and Ptotal' [dBm]) with high accuracy, except when Pin [dBm] is very small (for example, Pin≤−37.00).

Further, it indicates that the excitation light source apparatus 1 can perform the noise light correction (for example, the correction value A2 [dB] and Ptotal' [dBm]) with very high accuracy, except when Pin [dBm] is small (for example, Pin≤−33.00).

In the excitation light source apparatus 1 according to the present embodiment, the noise light correction can be performed with high accuracy, because the calculation of the correction value A2 [dB] can be performed with high accuracy if Pin [dBm] has a certain magnitude (for example, −35.00≤Pin). On the other hand, when Pin [dBm] is small (for example, Pin≤−37.00), since the value Pin [W] used in equation (5) is very small, the result of the calculation of the correction value A2 [dB] greatly changes due to a slight measurement error by the light level measuring instrument 13b, and thus the error becomes large.

The constant value K can also be calculated from the correlative relationship between Gain and Pase, as indicated in equation (1). The correction value corresponding to the input light level in the unexcited state may be acquired by using the constant value K calculated by using equation (1) and equation (5).

With regard to the correction value, the correction value corresponding to the input light level in the unexcited state may be acquired by finely changing the input light level in the unexcited state within a preset range, without calculating the constant value K.

The excitation light source apparatus 1 according to the present embodiment performs the amplification of the signal light by using stimulated Raman scattering which is nonlinear optical effect of the optical fiber. Specifically, the excitation light source apparatus 1 uses a phenomenon in which stimulated Raman scattering light (spontaneous emission optical noise) is generated at a wavelength that is approximately 100 nm longer than the signal light, when the total power of the signal light that passes through the transmission path exceeds a specific threshold value.

As above, according to the excitation light source apparatus 1 according to the first embodiment and the optical transmission system 100 including this excitation light source apparatus 1, the noise correction (the calculation of the corrected light level value) is performed by using the correction value indicated by the logarithmic value, and thus gain control with consideration given to the influence of the noise light caused by the Raman amplification can be performed with a simple configuration. For example, the excitation light source apparatus 1 does not require processing such as logarithmic transformation in the main controller 15 and the main controller 15 can perform the noise light correction with simple computation such as subtraction.

As a result, an expensive control device with high processing performance is not necessarily needed, but size reduction and cost reduction of the excitation light source apparatus 1 can be achieved.

Second Embodiment

An excitation light source apparatus 2 according to a second embodiment differs from the excitation light source apparatus 1 according to the first embodiment in that a main controller 215 does not include the noise corrector 16, and both of them are the same with each other in other points. However, the reference table 161 is provided in a gain controller 217 of the main controller 215.

With regard to the configuration and operation of the excitation light source apparatus 2 according to the second embodiment, the points that differ from the configuration and operation of the excitation light source apparatus 1 according to the first embodiment will be mainly described.

Figure 8:
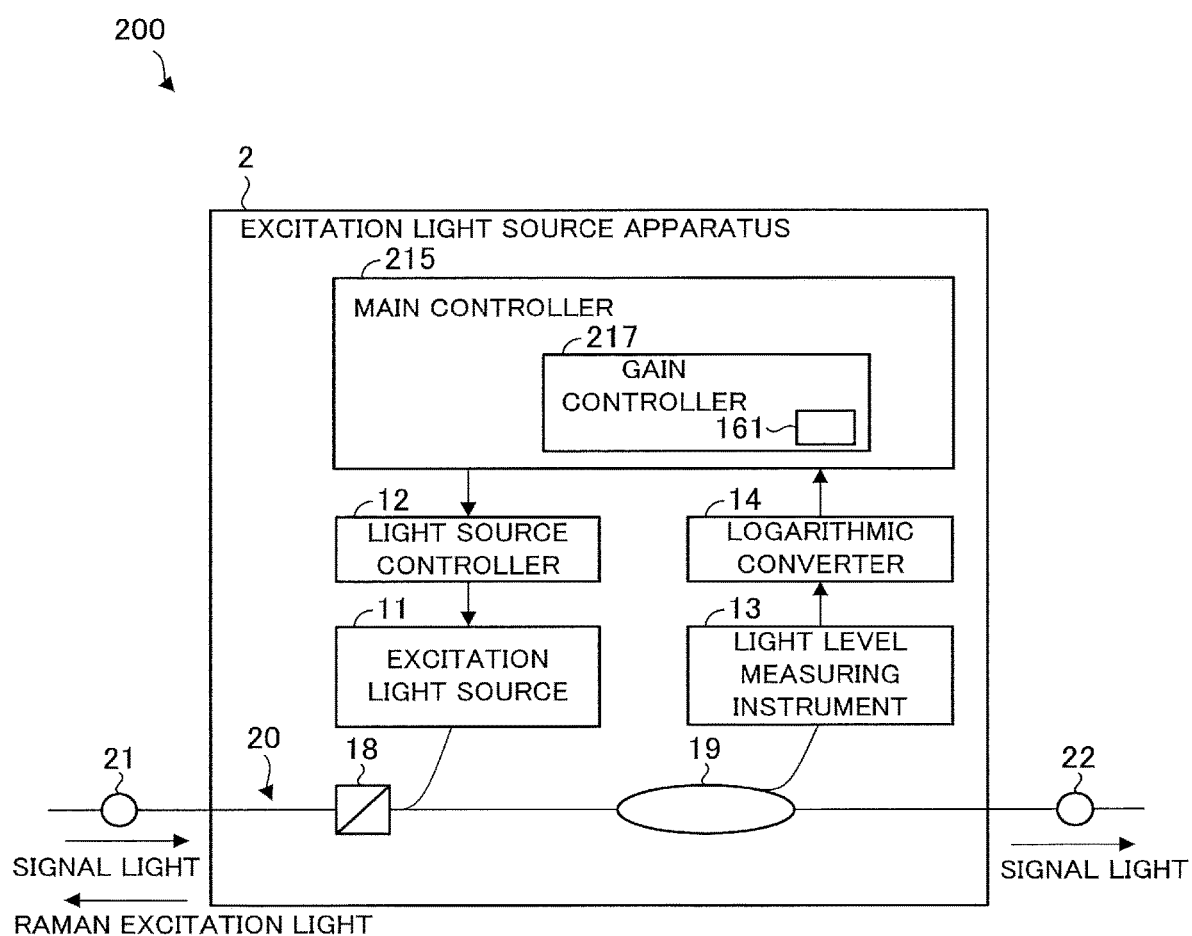
FIG. 8 is a block diagram schematically illustrating a configuration example of an optical transmission system that includes an excitation light source apparatus according to a second embodiment.

FIG. 8 is a block diagram schematically illustrating a configuration example of an optical transmission system 200 that includes the excitation light source apparatus 2 according to the second embodiment. The optical transmission system 200 includes an excitation light source apparatus 2 and a transmission path 20.

The excitation light source apparatus 2 includes an excitation light source 11, a light source controller 12, a light level measuring instrument 13, a logarithmic converter 14, a main controller 215, a multiplexer 18, a branching device 19, a port 21, and a port 22.

The main controller 215 includes a gain controller 217. The gain controller 217 includes the reference table 161. The configuration of the main controller 215 is not limited to the example illustrated in FIG. 8. For example, the main controller 215 may include a memory storing the reference table 161, outside the gain controller 217.

The main controller 215 decides the correction value noise correction value) based on the logarithmic value of the measurement result of measuring by the light level measuring instrument 13 in the stop state of the excitation light source 11, and controls the light source controller 12 by using the decided correction value and a preset gain control target value G0. However, in the present embodiment, the gain control target value is changed from the gain control target value G0 to a corrected gain target value G2, as described later.

The gain controller 217 corrects the influence of the noise light generated by the Raman amplification, in the gain control. Specifically, in the gain control, the gain controller 217 calculates the corrected gain target value G2 by adding the correction value to the preset gain control target value G0 and sets this corrected gain target value G2 as a new gain control target value.

The gain controller 217 controls the light source controller 12, so that the Raman gain G3 described later gets closer to the corrected gain target value G2.

Next, the operation of the gain control by the excitation light source apparatus 2 will be described while referring to FIG. 9.

Figure 9:
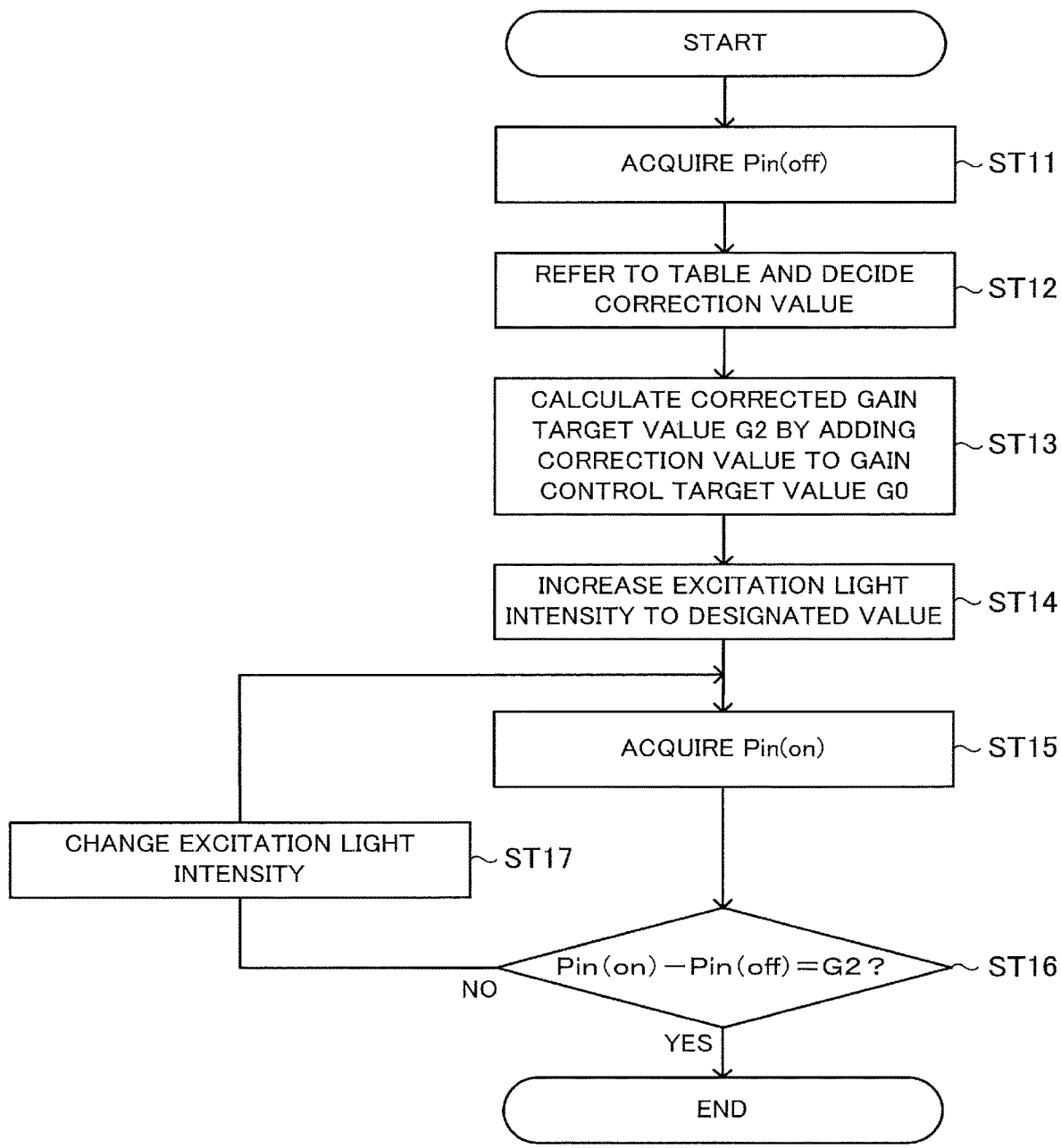
FIG. 9 is a flowchart illustrating an example of gain control by the excitation light source apparatus.

FIG. 9 is a flowchart illustrating an example of the gain control by the excitation light source apparatus 2.

In the present embodiment, the process illustrated in FIG. 9 is always executed, while the signal light is received from the port 21 of the excitation light source apparatus 2. However, the process illustrated in FIG. 9 may be stopped at an arbitrary time point.

In step ST11, the light level measuring instrument 13 measures the input light level, in the stop state (unexcited state) of the excitation light source 11.

In step ST11, information on the measured input light level is converted to a logarithmic value (Pin(off)) by the logarithmic converter 14, and the converted value is transmitted to the gain controller 217 of the main controller 215.

In step ST12, the gain controller 217 of the main controller 215 refers to the reference table 161 and decides the correction value on the basis of the transmitted value. Specifically, the gain controller 217 decides the correction value corresponding to the input light level that is identical with the transmitted value, from a plurality of input light levels (Pin(off)) stored in the reference table 161. When the transmitted value is not stored in the reference table 161, the correction value corresponding to the closest value may be decided from a plurality of input light levels stored in the reference table 161.

In step ST13, the gain controller 217 calculates the corrected gain target value G2 by adding the correction value decided in step ST12 to the preset gain control target value G0, and sets this corrected gain target value G2 as a new gain control target value. That is, the gain controller 217 changes the control target value for the excitation light intensity, from the gain control target value G0 to the corrected gain target value G2.

In step ST14, the gain controller 217 controls the light source controller 12 to generate the excitation light, and the light source controller 12 increases the excitation light intensity of the excitation light source 11 to a designated value.

In step ST15, the light level measuring instrument 13 measures the light level of the input signal light, in the drive state (excited state) of the excitation light source 11. The information on the measured light level in the excited state is converted to a logarithmic value (Pin(on)) by the logarithmic converter 14, and the converted value is transmitted to the gain controller 217. The main controller 215 acquires Pin(on) from the logarithmic converter 14.

In step ST16, the gain controller 217 of the main controller 215 calculates the Raman gain G3 at the current time point in the excitation light source apparatus 2, by using the difference (Pin(on)−Pin(off)) between Pin(on) transmitted in step ST15 and Pin(off) transmitted in step ST11, and compares the calculated Raman gain G3 and the corrected gain target value G2. In the present embodiment, the Raman gain G3 is expressed by the ratio between the input light level in the unexcited state and the input light level of the signal light including the noise light in the excited state. Thus, the Raman gain G3 differs from the Raman gain G1 calculated by using Pin(off) and Pin(on)'.

If the gain controller 217 determines that the corrected gain target value G2 and the Raman gain G3 are not identical in step ST16 ("NO" in step ST16), the process proceeds to step ST17.

In step ST17, the gain controller 217 controls the light source controller 12 according to the difference between the corrected gain target value G2 and the Raman gain G3, and changes the excitation light intensity of the excitation light source 11. Although an arbitrary value can be designated as the change amount of the excitation light intensity, it is desirable that the gain controller 217 controls the light source controller 12 so that the difference between Pin(on) and Pin(off) (i.e., the Raman gain G3) gets closer to the corrected gain target value G2. Accordingly, it is possible to promptly complete the gain control.

After step ST17, the process proceeds to step ST15, and the above processes are performed.

On the other hand, if it is determined that the corrected gain target value G2 and the Raman gain G3 are identical in step ST16 ("YES" in step ST16), the flow of the gain control illustrated in FIG. 9 ends.

As described above, in step ST16, it is determined whether or not the corrected gain target value G2 and the Raman gain G3 are identical. However, it is not limited to this determination method; by setting a range of the difference that is assumed to be identical as a determination condition, the determination may be made by determining that the corrected gain target value G2 and the Raman gain G3 are identical if the difference between the corrected gain target value G2 and the Raman gain G3 is within the range of the determination condition.

As described above, if it is determined that the corrected gain target value G2 and the Raman gain G3 are identical in step ST16, the gain control ends. However, it is not limited to this method; the light level may be measured cyclically regardless of the determination result, and the light source controller 12 may continue controlling the excitation light intensity. In this case, a precondition is that the input light level in the unexcited state does not change due to increase and decrease of the wavelength, fluctuation in the state of the transmission path 20, or the like.

As described above, if it is determined that the corrected gain target value G2 and the Raman gain G3 are identical in step ST16, the gain control ends. However, it is not limited to this method; by setting a limit value on the number of trial times or a trial time for the gain control, the gain control may be ended if it exceeds the limit value.

If it is determined that the corrected gain target value G2 and the Raman gain G3 are identical in step ST16, the gain controller 217 may store control information on the light source controller 12 and continue the control of the light source controller 12 in accordance with the stored control information. Here, although the control information stored in the gain controller 217 and the control target of the gain controller 217 may be either the excitation light intensity or the current value of the excitation light source 11, it is more desirable to use the excitation light intensity as the control target.

As above, according to the excitation light source apparatus 2 according to the second embodiment and the optical transmission system 200 including this excitation light source apparatus 2, the noise correction (the calculation of the Raman gain G3) is performed by using the correction value expressed by the logarithmic value, and thus gain control with consideration given to the influence of the noise light caused by the Raman amplification can be performed with a simple configuration. For example, the excitation light source apparatus 2 does not require processing such as logarithmic transformation in the main controller 215 and the main controller 215 can perform the noise light correction with simple computation such as addition.

As a result, an expensive control device with high processing performance is not necessarily needed, but size reduction and cost reduction of the excitation light source apparatus 2 can be achieved.

Third Embodiment

An excitation light source apparatus 3 according to a third embodiment includes a main controller 315 instead of the main controller 15 of the excitation light source apparatus 1 according to the first embodiment, and differs from the excitation light source apparatus 1 according to the first embodiment in including a light source controller 312 instead of the light source controller 12 of the excitation light source apparatus 1, and both of them are the same with each other in other points. Specifically, the main controller 315 includes a gain controller 317 and a noise corrector 16.

Points of difference between the configuration and operation of the excitation light source apparatus 3 according to the third embodiment and the configuration and operation of the excitation light source apparatus 1 will be mainly described.

Figure 10:
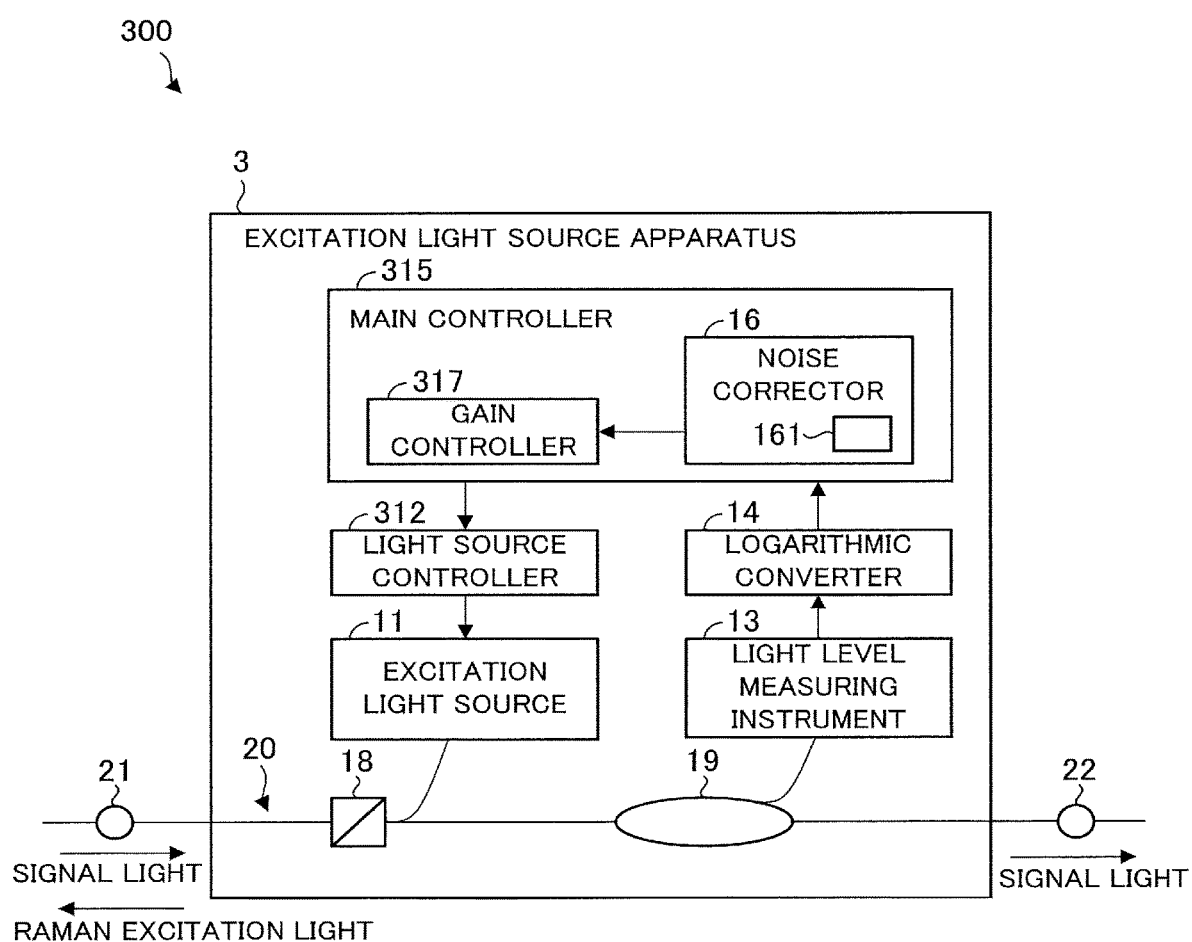
FIG. 10 is a block diagram schematically illustrating a configuration example of an optical transmission system that includes an excitation light source apparatus according to a third embodiment.

FIG. 10 is a block diagram schematically illustrating a configuration example of an optical transmission system 300 that includes the excitation light source apparatus 3 according to the third embodiment. The optical transmission system 300 includes an excitation light source apparatus 3 and a transmission path 20.

The excitation light source apparatus 3 includes an excitation light source 11, a light source controller 312, a light level measuring instrument 13, a logarithmic converter 14, a main controller 315, a multiplexer 18, a branching device 19, a port 21, and a port 22.

The light source controller 312 controls the excitation light intensity generated by the excitation light source 11, on the basis of control of the main controller 315 (for example, the gain controller 317). The light source controller 312 monitors the excitation light intensity and transmits it to the main controller 315 (for example, the gain controller 317). The light source controller 312 can be configured with an FPGA, for example.

The main controller 315 includes the noise corrector 16 and the gain controller 317. The main controller 315 decides a correction value (noise correction value) based on the logarithmic value of a measurement result of measuring by the light level measuring instrument 13 in the stop state of the excitation light source 11, and controls the light source controller 312 by using the decided correction value and a preset gain control target value G0.

The gain controller 317 controls the light source controller 312 by using the correction value based on the logarithmic value of the measurement result in the stop state and the gain control target value G0. Specifically, the gain controller 317 calculates a corrected light level value, by subtracting the correction value from the logarithmic value of a measurement result in the drive state. Further, the gain controller 317 controls the light source controller 312, so that the difference between the corrected light level value and the logarithmic value of a measurement result in the drive state gets closer to the gain control target value G0.

Next, an operation of gain control by the excitation light source apparatus 3 will be described while referring to FIG. 11.

Figure 11:
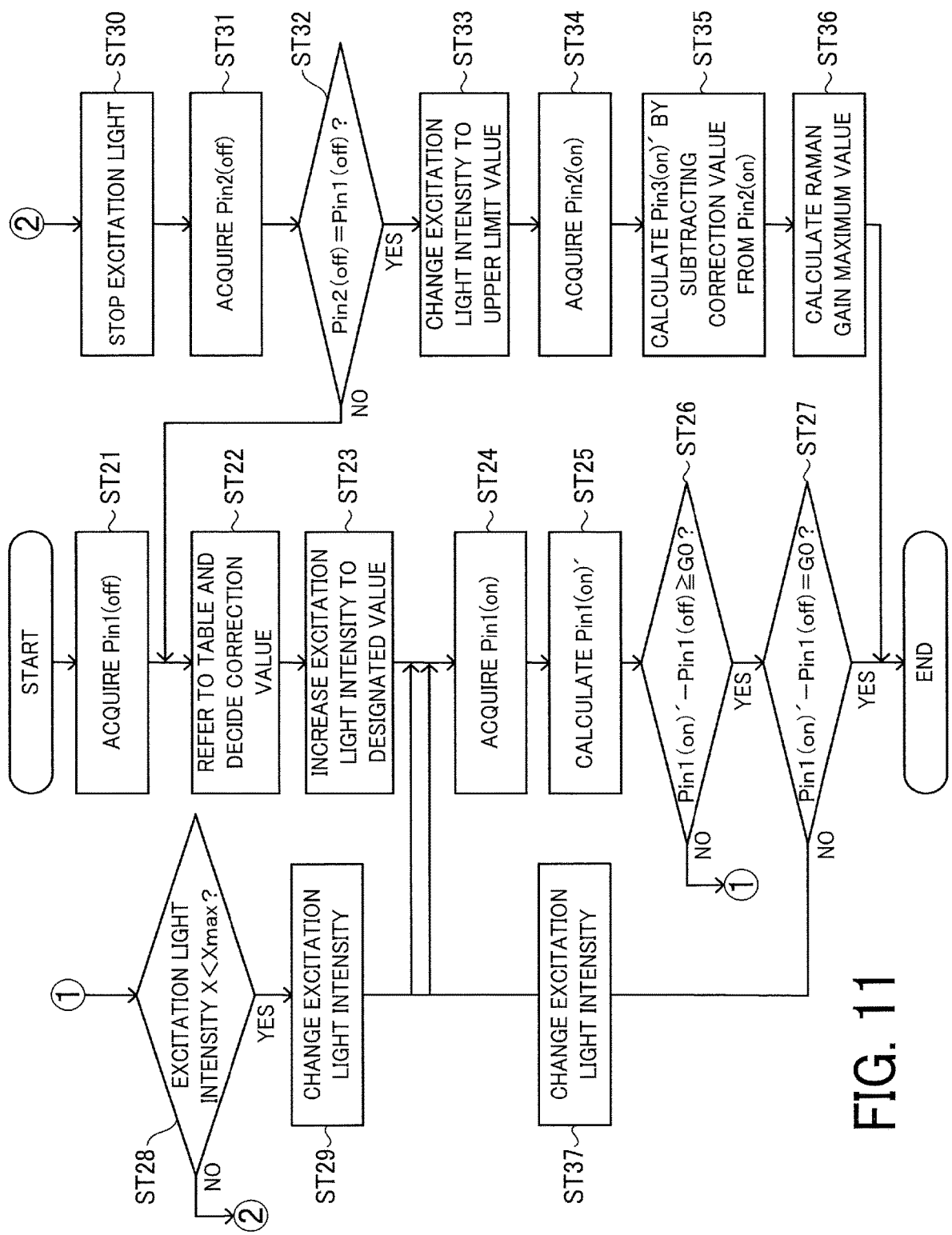
FIG. 11 is a flowchart illustrating an example of gain control by the excitation light source apparatus.

FIG. 11 is a flowchart illustrating an example of the gain control by the excitation light source apparatus 3.

In the present embodiment, a process illustrated in FIG. 11 is continuously executed, while the signal light is received from the port 21 of the excitation light source apparatus 3. However, the process illustrated in FIG. 11 may be stopped at an arbitrary time point.

In step ST21, the light level measuring instrument 13 measures the input light level, in the stop state (unexcited state) of the excitation light source 11.

In step ST21, info Ration on the measured input light level (first measurement result) is converted to a logarithmic value (Pin1(off)) (the logarithmic value of the first measurement result) by the logarithmic converter 14, and the converted value is transmitted to the noise corrector 16 of the main controller 315. The main controller 315 acquires Pin1(off) from the logarithmic converter 14. The logarithmic converter 14 stores the information transmitted to the main controller 315 (for example, the noise corrector 16).

In step ST22, the noise corrector 16 of the main controller 315 refers to the reference table 161 and decides the correction value on the basis of the transmitted value.

In step ST23, the gain controller 317 controls the light source controller 312 to generate excitation light, and the light source controller 312 increases the excitation light intensity of the excitation light source 11 to a designated value.

In step ST24, the light level measuring instrument 13 measures the light level of input signal light, in the drive state (excited state) of the excitation light source 11. Information on the light level measured in the excited state is converted to a logarithmic value (Pin1(on)) by the logarithmic converter 14, and the converted value is transmitted to the noise corrector 16. The main controller 315 acquires Pin1(on) from the logarithmic converter 14.

In step ST25, the noise corrector 16 calculates a corrected light level value Pin1(on)' (first corrected light level value) by subtracting the correction value decided in step ST22 from the value transmitted in step ST24. The calculated Pin1(on)' is transmitted to the gain controller 317.

In step ST26, the gain controller 317 of the main controller 315 calculates Raman gain G1 at the current time point in the excitation light source apparatus 3, by using the difference (Pin1(on)'-Pin1(off)) between Pin1(on)' transmitted in step ST25 and Pin1(off) transmitted in step ST21, and compares the calculated Raman gain G1 and a preset gain control target value G0.

If the gain controller 317 determines that the Raman gain G1 is smaller than the gain control target value G0 in step ST26 ("NO" in step ST26), the process proceeds to step ST28. On the other hand, if the gain controller 317 determines that the Raman gain G1 is equal to or larger than the gain control target value G00 in step ST26 ("YES" in step ST26), the process proceeds to step ST27.

If the gain controller 317 determines that the Raman gain G1 and the gain control target value G0 are equal in step ST27 ("YES" in step ST27), the flow of the gain control illustrated in FIG. 11 ends. On the other hand, if the gain controller 317 determines that the Raman gain G1 and the gain control target value G0 are not equal in step ST27 ("NO" in step ST27), the process proceeds to step ST37.

In step ST37, the gain controller 317 controls the light source controller 12 according to the difference between the gain control target value G0 and the Raman gain G1 to change the excitation light intensity of the excitation light source 11. Although an arbitrary value can be designated as the change amount of the excitation light intensity, it is desirable that the gain controller 317 control the light source controller 12 so that the difference (i.e., the Raman gain G1) between Pin1(on)' and Pin1(off) gets closer to the gain control target value G0. Accordingly, it is possible to promptly complete the gain control.

After step ST37, the process proceeds to step ST24, and the above processes are performed.

In step ST28, the light source controller 312 compares the excitation light intensity X at the current time point and a preset upper limit value Xmax of the excitation light intensity. If the light source controller 312 determines that the excitation light intensity X is smaller than the upper limit value Xmax of the excitation light intensity in step ST28 ("YES" in step ST28), the process proceeds to step ST29. On the other hand, if the light source controller 312 determines that the current excitation light intensity X is equal to or larger than the excitation light intensity upper limit value Xmax in step ST28 ("NO" in step ST28), the process proceeds to step ST30.

In step ST29, the gain controller 317 controls the light source controller 312 according to the difference between the gain control target value G0 and the Raman gain G1 to change the excitation light intensity of the excitation light source 11. Although an arbitrary value can be designated as the change amount of the excitation light intensity, it is desirable that the gain controller 317 control the light source controller 12 so that the difference (i.e., the Raman gain G1) between Pin1(on)' and Pin1(off) gets closer to the gain control target value G0. Accordingly, it is possible to promptly complete the gain control.

After step ST29, the process proceeds to step ST24, and the above processes are performed.

In step ST30, the gain controller 317 controls the light source controller 312 to stop generating the excitation light, and the light source controller 312 controls the excitation light source 11 to stop generating the excitation light.

In step ST31, the light level measuring instrument 13 measures the input light level in the stop state of the excitation light source 11, while the gain controller 317 controls the light source controller 312 to stop generating the excitation light. In step ST31, the information (third measurement result) of the measured input light level is converted to a logarithmic value (Pin2(off)) (the logarithmic value of the third measurement result) by the logarithmic converter 14, and the converted logarithmic value is transmitted to the noise corrector 16. The main controller 315 acquires Pin1(off) from the logarithmic converter 14.

In step ST32, the logarithmic converter 14 compares Pin1(off) measured in step ST21 and Pin2(off) measured in step ST31. If the logarithmic converter 14 determines that these values are identical with each other in step ST32 ("YES" in step ST32), the process proceeds to step ST33.

On the other hand, if the logarithmic converter 14 determines that these values are not identical with each other in step ST32 ("NO" in step ST32), the process proceeds to step ST22, and the above processes are performed.

For example, in step ST22 after step ST32, the noise corrector 16 of the main controller 315 refers to the reference table 161 and decides a correction value on the basis of Pin2(off) measured in step ST31, and the processes of step ST23 and the following steps are performed. For example, a corrected light level value Pin2(on)' (second corrected light level value) is calculated by subtracting the correction value based on Pin2(off) from Pin2(on) (the logarithmic value of a fourth measurement result) calculated newly. Further, the gain controller 317 controls the light source controller 12 according to the difference (Raman gain G4) between Pin2(on)' and Pin2(off) to change the excitation light intensity of the excitation light source 11. Although an arbitrary value can be designated as the change amount of the excitation light intensity, it is desirable that the gain controller 317 control the light source controller 12 so that the difference (i.e., the Raman gain G4) between Pin2(on)' and Pin2(off) gets closer to the gain control target value G0. Accordingly, it is possible to promptly complete the gain control.

In step ST33, the gain controller 317 controls the light source controller 312 so that the excitation light intensity is changed to a preset upper limit value (excitation light intensity upper limit value Xmax), and the light source controller 312 controls the excitation light source 11 so that the excitation light intensity X of the excitation light source 11 becomes the excitation light intensity upper limit value Xmax.

In step ST34, the light level measuring instrument 13 measures the input light level in the excited state in which the excitation light intensity is set to the preset upper limit value. In step ST34, the information on the measured light level (third measurement result) is converted to a logarithmic value (Pin2(on)) (the logarithmic value of the third measurement result) by the logarithmic converter 14, and the converted logarithmic value is transmitted to the noise corrector 16. The main controller 315 acquires Pin2(on) from the logarithmic converter 14.

In step ST35, the noise corrector 16 calculates a corrected light level value Pin3(on)' (third corrected light level value) by subtracting the correction value decided in step ST22 from Pin2(on) transmitted in step ST34. The calculated Pin3(on)' is transmitted to the gain controller 317.

In step ST36, the gain controller 317 calculates a Raman gain maximum value (the ratio between the logarithmic value of the first measurement result and the third corrected light level value) in the excitation light source apparatus 3, by using the difference (Pin3(on)'−Pin1(off)) between Pin1(off) measured in step ST21 and Pin3(on)' calculated in step ST35, and ends the flow of the gain control illustrated in FIG. 11.

As described above, it is determined whether or not the Raman gain G1 and the gain control target value G0 are identical, in step ST26 and step ST27. However, it is not limited to this determination method; by setting a range of the difference that is assumed to be identical as a determination condition, the determination may be made by determining that the Raman gain G1 and the gain control target value G0 are identical if the difference between the Raman gain G1 and the gain control target value G0 is within the range of the determination condition.

As described above, if it is determined that the Raman gain G1 and the gain control target value G0 are identical in step ST26 and step ST27, the gain control ends. However, it is not limited to this method; the light level may be measured cyclically, and the light source controller 312 may continue controlling the excitation light intensity, regardless of the determination result. In this case, the precondition is that the input light level in the unexcited state does not change due to increase and decrease of the wavelength, fluctuation of the state of the transmission path 20, or the like.

As described above, if it is determined that the Raman gain G1 and the gain control target value G0 are identical in step ST26 and step ST27, the gain control ends. However, it is not limited to this method; by setting a limit value of the number of trial times or the trial time of the gain control, the gain control may be ended if it exceeds the limit value.

If it is determined that the Raman gain G1 and the gain control target value G0 are identical in step ST27, and if the Raman gain maximum value is calculated and the gain control ends in step ST36, the gain controller 317 may store information on control of the light source controller 312 and continue the control of the light source controller 312 in accordance with the stored control information. Here, although the control information stored in the gain controller 317 and the control target by the gain controller 317 may be either the excitation light intensity or the current value, it is more desirable to use the excitation light intensity as the control target.

If the Raman gain maximum value is calculated in step ST36 and the gain control is ended, the excitation light source apparatus 3 may inform, by transmitting an alert, for example, a network device in the optical transmission system 300 or a network administrator that the Raman gain does not reach the gain control target value G0 and of the calculated Raman gain maximum value.

As above, the excitation light source apparatus 3 according to the third embodiment has the same effect as the excitation light source apparatus 1 according to the first embodiment.

The excitation light source apparatus 3 according to the third embodiment and the optical transmission system 300 including this excitation light source apparatus 3 check if there is fluctuation of the input light level in the unexcited state (step ST32) when the Raman gain G1 does not reach the gain control target value G0, and if there is fluctuation, reset the correction value. Therefore, it is possible to perform highly accurate gain control.

The excitation light source apparatus 3 according to the third embodiment checks if there is fluctuation of the input light level in the unexcited state (step ST32), when the Raman gain G1 does not reach the gain control target value G0. If there is no fluctuation of the input light level in the unexcited state, it is possible to set the excitation light intensity to the upper limit value (maximum gain) and to inform a network administrator or the like of the calculated Raman gain maximum value.

Fourth Embodiment

Figure 12:
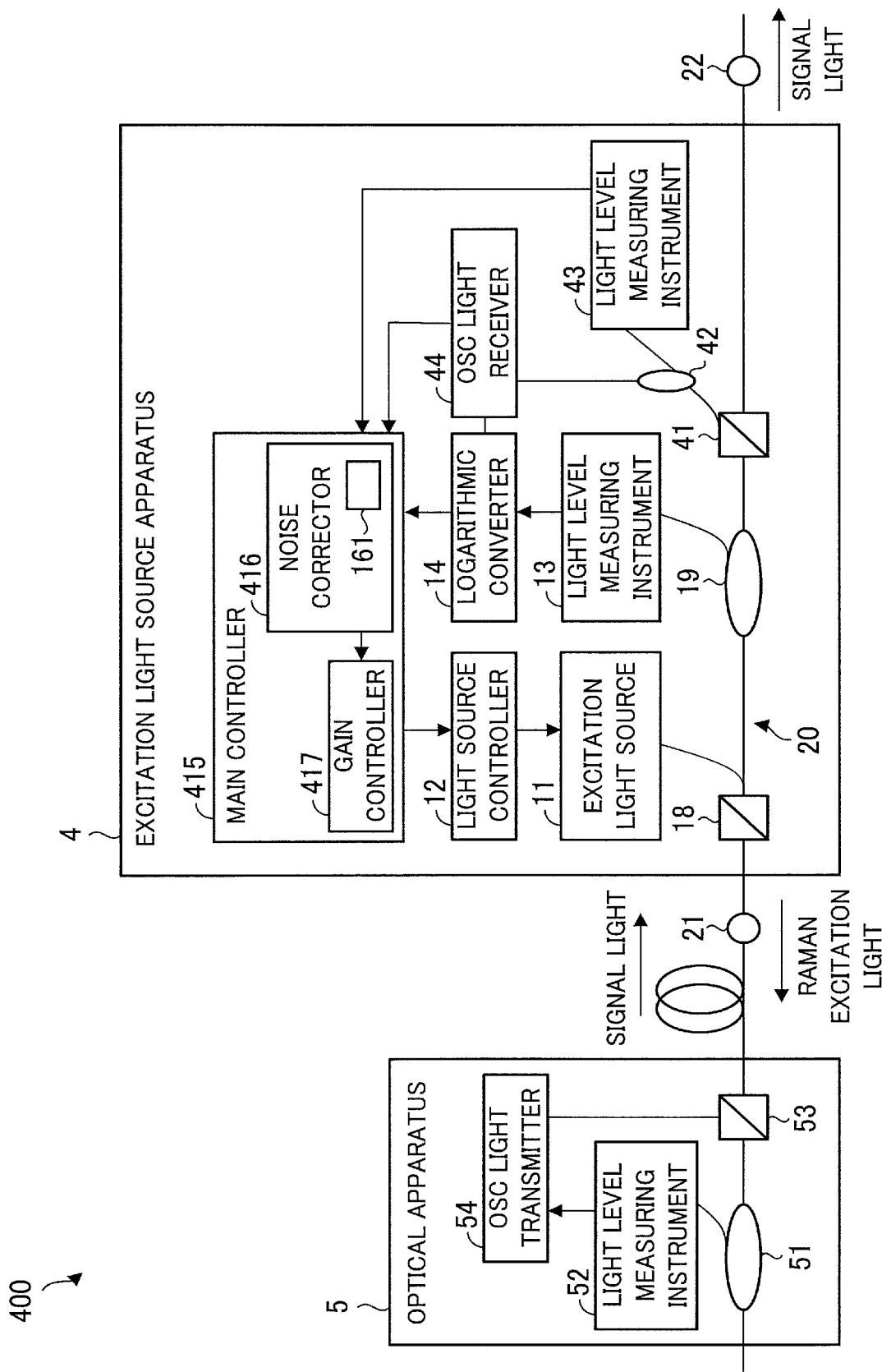
FIG. 12 is a block diagram schematically illustrating a configuration example of an optical transmission system that includes an excitation light source apparatus according to a fourth embodiment of the present invention.

FIG. 12 is a block diagram schematically illustrating a configuration example of an optical transmission system 400 including an excitation light source apparatus 4 according to a fourth embodiment of the present invention.

The optical transmission system 400 illustrated in FIG. 12 includes a transmission path 20 (transmission path fiber), an excitation light source apparatus 4 as a reception station, and an optical apparatus 5 as a transmitter station which transmits OSC light (optical supervisory signal: optical supervisory channel). The optical apparatus 5 and the excitation light source apparatus 4 are connected via the transmission path 20.

Next, each component of the excitation light source apparatus 4 will be described.

The excitation light source apparatus 4 illustrated in FIG. 12 differs from the excitation light source apparatus 1 according to the first embodiment in further including a demultiplexer 41, a branching device 42, a light level measuring instrument 43 (supervisory light level measuring instrument), and an OSC light receiver 44 (supervisory light receiver), and both of them are the same with each other in other points.

The excitation light source apparatus 4 includes an excitation light source 11, a light source controller 12, a light level measuring instrument 13 (first light level measuring instrument), a logarithmic converter 14, a main controller 415, a multiplexer 18 (first multiplexer), a branching device 19 (first branching device), a port 21, a port 22, the demultiplexer 41 (second demultiplexer), the branching device 42 (second branching device), the light level measuring instrument 43 (second light level measuring instrument), and the OSC light receiver 44 (supervisory light receiver).

The main controller 415 includes a gain controller 417 and a noise corrector 416. The gain controller 417 of the main controller 415 controls the light source controller 12 on the basis of the OSC light transmitted from the optical apparatus 5 and a measurement result by the light level measuring instrument 13.

The noise corrector 416 includes a reference table 161. The noise corrector 416 corrects the influence of noise light generated by Raman amplification, in gain control. The noise corrector 416 can decide a correction value for correcting the influence of the noise light generated by the Raman amplification, on the basis of the logarithmic value of a measurement result in the unexcited state acquired from the logarithmic converter 14, the measurement result by the light level measuring instrument 43, or information received from the OSC light receiver 44. The noise corrector 416 calculates a corrected light level value by subtracting the correction value from the logarithmic value of a measurement result in the drive state of the excitation light source 11, in the gain control.

The gain controller 417 acquires the correction value from the noise corrector 416. The gain controller 417 controls the light source controller 12 by using the correction value and a gain control target value G0. Specifically, the gain controller 417 calculates the corrected light level value, by subtracting the correction value from the logarithmic value of the measurement result in the drive state. Further, the gain controller 417 controls the light source controller 12 so that the difference between the corrected light level value and the logarithmic value of the measurement result in the drive state gets closer to the gain control target value G0.

The demultiplexer 41 demultiplexes light input into the excitation light source apparatus 4 to two lines. In particular, the OSC light included in signal light is demultiplexed to the branching device 42 side.

The branching device 42 branches a part of the OSC light demultiplexed by the demultiplexer 41, and outputs it to two lines.

The light level measuring instrument 43 measures the OSC light level (the light level of the optical supervisory signal) demultiplexed by the demultiplexer 41, and informs the noise corrector 416 of the measurement result.

The OSC light receiver 44 receives the OSC light transmitted from the optical apparatus 5, and informs the noise corrector 416 of information included in the OSC light.

Next, each component of the optical apparatus 5 will be described.

The optical apparatus 5 illustrated in FIG. 12 includes a branching device 51, a light level measuring instrument 52, a multiplexer 53, and an OSC light transmitter 54. The optical apparatus 5 is provided on an upstream side of the excitation light source apparatus 4 in a direction of transmission of the signal light.

The branching device 51 branches a part of the light input into the optical apparatus 5, and outputs it to two lines.

The light level measuring instrument 52 measures the output light level of the optical apparatus 5, and informs the OSC light transmitter 54 of the measurement result.

The multiplexer 53 multiplexes the input light from the two lines.

The OSC light transmitter 54 transmits the OSC light (optical supervisory signal) to the excitation light source apparatus 4. The OSC light includes information indicating the light level of the signal light output from the optical apparatus 5. The wavelength of the OSC light and the wavelength of main signal light differ from each other. It is desirable that the wavelength (wavelength band) of the OSC light be set to the wavelength (wavelength band) that is not influenced by Raman amplification gain. Thus, it is desirable that the wavelength band of the OSC light be a wavelength band excluding the wavelength band of the main signal light (Raman gain band) and the Raman excitation light band. For example, when the wavelength-multiplexed main signal is set at 1550 nm in the C band and the Raman excitation light is set at approximately 1450 nm, the OSC light can be set at 1510 nm that is less likely to be influenced by Raman amplification, at approximately 1600 nm in the L band, in a band of wavelengths longer than the L band, or at 1400 nm or less that is shorter than the Raman excitation light.

Next, the operation of the gain control in the optical transmission system 400 will be described.

The light level measuring instrument 52 cyclically performs monitoring (measurement) of the light level, and transmits the measurement result to the OSC light transmitter 54.

The OSC light transmitter 54 informs the OSC light receiver 44 of the measurement result transmitted from the light level measuring instrument 52, through the OSC light.

The OSC light receiver 44 transmits the measurement result of the light level transmitted from the OSC light transmitter 54, to the noise corrector 416.

The noise corrector 416 of the main controller 415 monitors the measurement result of the light level measured by the light level measuring instrument 52 and transmitted from the OSC light receiver 44, and when a change occurs in the measurement result, sets again the correction value $A_n$ for the noise light correction according to the change.

In the present embodiment, the logarithmic value Pin(off) of the light level in the unexcited state is Pin1(off); the correction value corresponding to Pin1(off) is $A_n$=A(Pin1 (off)); and the measurement result by the light level measuring instrument 52 in an initial state is Pout(1)=Pin1(off).

When the measurement result by the light level measuring instrument 52 changes from Pout(1) to Pout(2), Pout(2) is informed the noise corrector 416 through the OSC light. Pout(1) and Pout(2) are converted to logarithmic values by the OSC light receiver 44. Pout(1) and Pout(2) may be converted to the logarithmic values by the logarithmic converter 14.

The noise corrector 416 calculates the change amount (ΔPout=Pout(2)−Pout(1)) of the light level. The noise corrector 416 calculates Pin2(off) as new Pin(off), by adding the calculated change amount ΔPout to Pin1(off).

The noise corrector 416 decides a new correction value A(Pin2(off)) on the basis of the calculated Pin2(off). The noise corrector 416 transmits Pin2(off) to the gain controller 417.

Processes after the decision of the new correction value A(Pin2(off)) are the same as the processes of step ST3 and the following steps illustrated in FIG. 3.

Moreover, the light level measuring instrument 43 cyclically performs the monitoring of the light level of the OSC light, and transmits the measurement result to the noise corrector 416 and the gain controller 417.

The noise corrector 416 monitors the measurement result of the light level transmitted from the light level measuring instrument 43. When there is a change in the measurement result, the noise corrector 416 newly calculates the light level Pin(off) in the unexcited state according to the change amount and resets the correction value, in the same way as when there is a change in the measurement result by the light level measuring instrument 52.

Note that the monitoring of the measurement result by the light level measuring instrument 52 has a purpose of monitoring the change of the output light level of the optical apparatus 5. Here, a factor of the change of the output level of the optical apparatus 5 is a change of the number of wavelengths or the like.

In the present embodiment the light level measuring instrument 52 monitors the output light level of the optical apparatus 5. However, the change of the output light level of the optical apparatus 5 may be monitored by monitoring information on the number of wavelengths in the case of a device whose output light level per wave is constant.

Moreover, the monitoring of the measurement result of the light level measuring instrument 43 has a purpose of monitoring the change of the OSC light level input into the excitation light source apparatus 4. Here, as a factor of the change of the OSC light level, a change in transmission line loss or the like is given.

As above, the excitation light source apparatus 4 according to the fourth embodiment and the optical transmission system 400 including this excitation light source apparatus 4 have the same effect as the excitation light source apparatus 1 according to the first embodiment and the optical transmission system 100 including this excitation light source apparatus 1.

Further, according to the excitation light source apparatus 4 and the optical transmission system 400, the information on the light level of the signal light is informed the excitation light source apparatus 4 through the OSC light.

Further, by setting the wavelength range of the OSC light to the wavelength range that is not influenced by the Raman amplification effect, the change of the light level in the unexcited state due to a change in transmission line loss can be detected even in the drive state of the excitation light source 11, and noise light correction can be performed each time.

Variant Example

Figure 13:
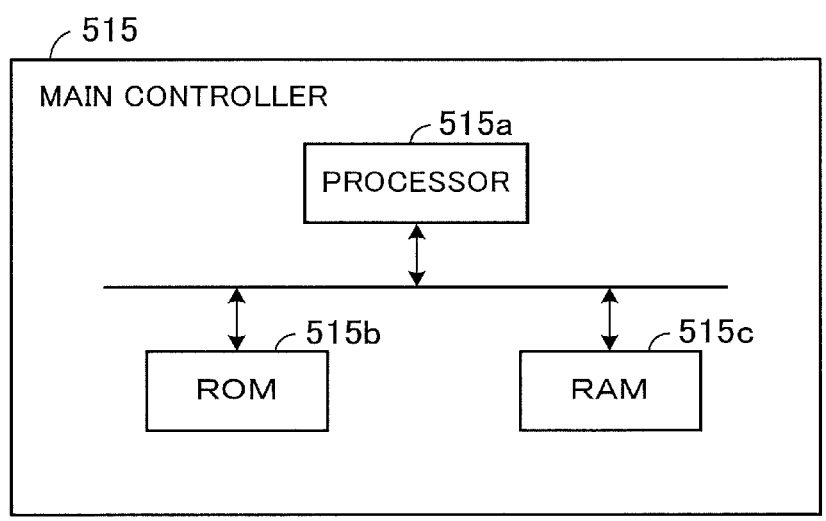
FIG. 13 is a block diagram illustrating a configuration of a main controller in an excitation light source apparatus according to a variant example.

FIG. 13 is a block diagram illustrating a configuration of a main controller 515 in an excitation light source apparatus according to a variant example. The controller 515 is applicable to the main controllers 15, 215, 315, and 415 in the respective excitation light source apparatuses according to the first to fourth embodiments.

The main controller 515 includes a processor 515a such as a CPU (Central Processing Unit), a ROM (Read Only Memory) 515b, and a RAM (Random Access Memory) 515c. The ROM 515b stores a program and the like for controlling the components in the excitation light source apparatus. The RAM 515c is used as a memory region for loading the program, etc. stored in the ROM 515b. The processor 515a achieves the function of the main controller 515, by loading the program into the RAM 515c and executing the program, for example. For example, the respective functions of the gain controller 17 and the noise corrector 16 described in the first embodiment are implemented by the processor 515a executing the program stored in the ROM 515b. The main controller 515 may achieve the function of the light source controller 12 described in the first embodiment.

The feature of each embodiment and the feature of the variant example described above can be combined with each other as appropriate.

DESCRIPTION OF REFERENCE CHARACTERS 1, 2, 3, 4 excitation light source apparatus, 5 optical apparatus, 11 excitation light source, 12, 312 light source controller, 13, 43, 52 light level measuring instrument, 14 logarithmic converter, 15, 215, 315, 415 main controller, 16, 416 noise corrector, 17, 217, 317, 417 gain controller, 18, 53 multiplexer, 19, 42, 51 branching device, 20 transmission path, 21, 22 port, 41 demultiplexer, 44 OSC light receiver, 54 OSC light transmitter, 100, 200, 300, 400 optical transmission system.

What is claimed is:

1. An excitation light source apparatus for outputting Raman excitation light for amplifying signal light, to a transmission path through which the signal light is transmitted, the excitation light source apparatus comprising:
   an excitation light source to generate the Raman excitation light in a drive state and to stop generating the Raman excitation light in a stop state;
   a light source controller to control intensity of the Raman excitation light in the drive state;
   a light level measuring instrument to measure a light level of a signal light input into the excitation light source apparatus;
   a logarithmic converter to convert at least one measurement result of measuring by the light level measuring instrument to a logarithmic value; and
   a main controller to decide a correction value based on a logarithmic value of the at least one measurement result in the stop state, wherein the main controller controls the light source controller by using the correction value and a preset gain control target value, wherein the main controller acquires, from the logarithmic converter, a logarithmic value of a first measurement result of the at least one measurement result in the stop state and a logarithmic value of a second measurement result of the at least one measurement result in the drive state, decides the correction value based on the logarithmic value of the first measurement result, calculates a first corrected light level value by subtracting the correction value based on the logarithmic value of the first measurement result from the logarithmic value of the second measurement result, and controls the light source controller so that a difference between the first corrected light level value and the logarithmic value of the first measurement result approaches the preset gain control target value.

2. The excitation light source apparatus according to claim 1, wherein the main controller acquires a logarithmic value of a third measurement result of the at least one measurement result in the stop state from the logarithmic converter by controlling the light source controller to stop generating the Raman excitation light when the difference between the first corrected light level value and the logarithmic value of the first measurement result is smaller than the preset gain control target value, decides a correction value based on the logarithmic value of the third measurement result, calculates a second corrected light level value by subtracting the correction value based on the logarithmic value of the third measurement result from a logarithmic value of a fourth measurement result of the at least one measurement result in the drive state, and controls the light source controller so that a difference between the second corrected light level value and the logarithmic value of the third measurement result gets closer to approaches the preset gain control target value.

3. The excitation light source apparatus according to claim 1, wherein the main controller controls the light source controller to change the intensity of the Raman excitation light to a preset upper limit value, when the difference between the first corrected light level value and the logarithmic value of the first measurement result is smaller than the preset gain control target value.

4. The excitation light source apparatus according to claim 3, wherein the main controller acquires, from the logarithmic converter, the logarithmic value of a third measurement result of the at least one measurement result in the drive state in which the intensity of the Raman excitation light is set to the preset upper limit value, calculates a third corrected light level value by subtracting the correction value based on the logarithmic value of the first measurement result from the logarithmic value of the third measurement result, and calculates a gain indicated by a ratio between the logarithmic value of the first measurement result and the third corrected light level value.

5. An excitation light source apparatus for outputting Raman excitation light for amplifying signal light, to a transmission path through which the signal light is transmitted, the excitation light source apparatus comprising:

an excitation light source to generate the Raman excitation light in a drive state and to stop generating the Raman excitation light in a stop state;

a light source controller to control intensity of the Raman excitation light in the drive state;

a light level measuring instrument to measure a light level of a signal light input into the excitation light source apparatus;

a logarithmic converter to convert at least one measurement result of measuring by the light level measuring instrument to a logarithmic value; and a main controller to decide a correction value based on a logarithmic value of the at least one measurement result in the stop state, wherein the main controller controls the light source controller by using the correction value and a preset gain control target value, wherein the main controller calculates a corrected gain target value by adding the correction value to the preset gain control target value, and controls the light source controller so that a difference between a logarithmic value of the at least one measurement result in the drive state and the logarithmic value of the at least one measurement result in the stop state approaches the corrected gain target value.

6. The excitation light source apparatus according to claim 1, wherein the light source controller controls the intensity of the Raman excitation light by controlling an electric current supplied to the excitation light source, and controls the electric current so that the intensity of the Raman excitation light is maintained constant while the Raman excitation light is generated.

7. The excitation light source apparatus according to claim 1, wherein the signal light measured by the light level measuring instrument in the drive state includes main signal light and noise light.

8. The excitation light source apparatus according to claim 7, wherein the preset gain control target value is a ratio between a light level of a main signal light input into the excitation light source apparatus in the stop state and a light level of the main signal light input into the excitation light source apparatus in the drive state.

9. The excitation light source apparatus according to claim 1, wherein the preset gain control target value is within a range of 4 dB or more and 16 dB or less.

10. The excitation light source apparatus according to claim 1, wherein the logarithmic value of the at least one measurement result in the stop state is within a range of −35.00 dBm or more.

11. An optical transmission system, comprising:

a transmission path through which signal light is transmitted; and the excitation light source apparatus according to claim 1.

12. The optical transmission system according to claim 11, further comprising an optical apparatus provided on an upstream side of the excitation light source apparatus in a direction of transmission of the signal light, the optical apparatus transmitting an optical supervisory signal, wherein the excitation light source apparatus includes:
- a supervisory light receiver to receive information on an optical supervisory signal input into the excitation light source apparatus, and
- a supervisory light level measuring instrument to measure a light level of the optical supervisory signal input into the excitation light source apparatus.

13. The optical transmission system according to claim 12, wherein
the optical supervisory signal includes information indicating a light level of a signal light output from the optical apparatus.

14. The optical transmission system according to claim 12, wherein
the main controller controls the light source controller on a basis of the optical supervisory signal transmitted from the optical apparatus and a result of measuring by the supervisory light level measuring instrument.

15. The optical transmission system according to claim 12, wherein
the signal light measured by the light level measuring instrument in the drive state includes main signal light and noise light, and
a wavelength of the optical supervisory signal is set to a wavelength that is not influenced by a Raman amplification gain.

16. An optical transmission system, comprising:
a transmission path through which signal light is transmitted; and
the excitation light source apparatus according to claim 5.

17. The optical transmission system according to claim 16, further comprising an optical apparatus provided on an upstream side of the excitation light source apparatus in a direction of transmission of the signal light, the optical apparatus transmitting an optical supervisory signal,
wherein the excitation light source apparatus includes:
- a supervisory light receiver to receive information on an optical supervisory signal input into the excitation light source apparatus, and
- a supervisory light level measuring instrument to measure a light level of the optical supervisory signal input into the excitation light source apparatus.

18. The optical transmission system according to claim 17, wherein
the optical supervisory signal includes information indicating a light level of a signal light output from the optical apparatus.

19. The optical transmission system according to claim 17, wherein
the main controller controls the light source controller on a basis of the optical supervisory signal transmitted from the optical apparatus and a result of a measuring by the supervisory light level measuring instrument.

20. The optical transmission system according to claim 17, wherein
the signal light measured by the light level measuring instrument in the drive state includes main signal light and noise light, and
a wavelength of the optical supervisory signal is set to a wavelength that is not influenced by a Raman amplification gain.

* * * * *